(12) United States Patent
Imai

(10) Patent No.: US 8,605,199 B2
(45) Date of Patent: Dec. 10, 2013

(54) ADJUSTMENT OF IMAGING PROPERTIES FOR AN IMAGING ASSEMBLY HAVING LIGHT-FIELD OPTICS

(75) Inventor: Francisco Imai, Mountain View, CA (US)

(73) Assignee: Canon Kabushiki Kaisha, Tokyo (JP)

(*) Notice: Subject to any disclaimer, the term of this patent is extended or adjusted under 35 U.S.C. 154(b) by 287 days.

(21) Appl. No.: 13/171,325

(22) Filed: Jun. 28, 2011

(65) Prior Publication Data

US 2013/0002928 A1     Jan. 3, 2013

(51) Int. Cl.
H04N 5/225       (2006.01)

(52) U.S. Cl.
USPC ..................................... 348/342; 348/333.12

(58) Field of Classification Search
None
See application file for complete search history.

(56) References Cited

U.S. PATENT DOCUMENTS

| | | | |
|---|---|---|---|
| 3,609,010 A | 9/1971 | Mueller | |
| 6,226,034 B1 | 5/2001 | Katayama | |
| 7,035,484 B2 | 4/2006 | Silberberg et al. | |
| 7,055,986 B2 | 6/2006 | Littleton | |
| 7,554,586 B1 | 6/2009 | Imai et al. | |
| 7,792,423 B2 | 9/2010 | Raskar et al. | |
| 7,817,201 B2 | 10/2010 | Shmizu et al. | |
| 7,831,100 B2 | 11/2010 | Gallagher | |
| 7,844,174 B2 | 11/2010 | Pickens et al. | |
| 7,949,252 B1* | 5/2011 | Georgiev ....................... 396/334 |
| 8,228,417 B1* | 7/2012 | Georgiev et al. .............. 348/340 |
| 2002/0012064 A1* | 1/2002 | Yamaguchi ................... 348/362 |
| 2005/0099513 A1* | 5/2005 | Ishibashi ....................... 348/234 |
| 2008/0131019 A1 | 6/2008 | Ng | |
| 2008/0303913 A1* | 12/2008 | Mertens ..................... 348/222.1 |
| 2009/0268970 A1 | 10/2009 | Babacan et al. | |
| 2011/0128412 A1* | 6/2011 | Milnes et al. ............ 348/231.99 |

OTHER PUBLICATIONS

Zaraga et al., "White balance by tunable spectral responsivities", Journal of Optical Society of America, Jan. 2010.*
Chan et al., "A Spectral Analysis for Light Field Rendering", Proceedings 2000 International Conference on Image Processing, vol. 2, 2000.
Hirsch et al., "BiDi Screen: A Thin, Depth-Sensing LCD for 3D Interaction Using Light Fields", ACM Transactions on Graphics, vol. 28, No. 9, 2009.

(Continued)

*Primary Examiner* — Nelson D. Hernández Hernández
*Assistant Examiner* — Dennis Hogue
(74) *Attorney, Agent, or Firm* — Fitzpatrick, Cella, Harper & Scinto

(57) ABSTRACT

Image capture using an image capture device which includes an imaging assembly having a spectral sensitivity tunable in accordance with a spectral capture mask and light-field optics for projecting a light-field of a scene onto the imaging assembly. A first spectral capture mask is applied to the imaging assembly and preview image data of a scene is captured under the first capture mask. A designation of a region of interest, and a designation of a capture preference in the region of interest are received. A second spectral capture mask is calculated by calculations which use the preview image data and the capture preference for the region of interest. The second spectral capture mask is applied to the imaging assembly, and light-field image data of the scene is captured under the second spectral capture mask.

33 Claims, 10 Drawing Sheets

(56) References Cited

OTHER PUBLICATIONS

Georgiev et al., "Unified Frequency Domain Analysis of Lightfield Cameras", ECCV '08 Proceedings of the 10th European Conference on Computer Vision: Part III, 2008.

Liang et al., "Programmable Aperture Photography: Multiplexed Light Field Acquisition", ACM Transactions on Graphics, vol. 27, No. 3, 2008.

Liang et al, "Light Field Acquisition Using Programmable Aperture Camera", Proceedings of IEEE Int'l Conference on Image Processing, 2007.

K. Hirakawa, et al., "Spatio-spectral color filter array design for enhanced image fidelity", Proc. of ICIP, 2007.

A. Longoni, et al., "The transverse field detector (TFD): a novel color-sensitive CMOS device", IEEE Electron Device Letters 29, pp. 1306-1308, 2008.

U.S. Appl. No. 12/871,826, filed Aug. 30, 2010 by Francisco Imai.
U.S. Appl. No. 12/949,592, filed Nov. 18, 2010 by Francisco Imai.
U.S. Appl. No. 13/033,578, filed Feb. 23, 2011 by John Haikin and Francisco Imai.
U.S. Appl. No. 12/859,115, filed Aug. 18, 2010 by Francisco Imai.
U.S. Appl. No. 12/949,566, filed Nov. 18, 2010 by Francisco Imai.
U.S. Appl. No. 13/073,634, filed Mar. 28, 2011 by Francisco Imai.
U.S. Appl. No. 12/886,337, filed Sep. 20, 2010 by Francisco Imai.
U.S. Appl. No. 13/029,076, filed Feb. 16, 2011 by Francisco Imai.

* cited by examiner

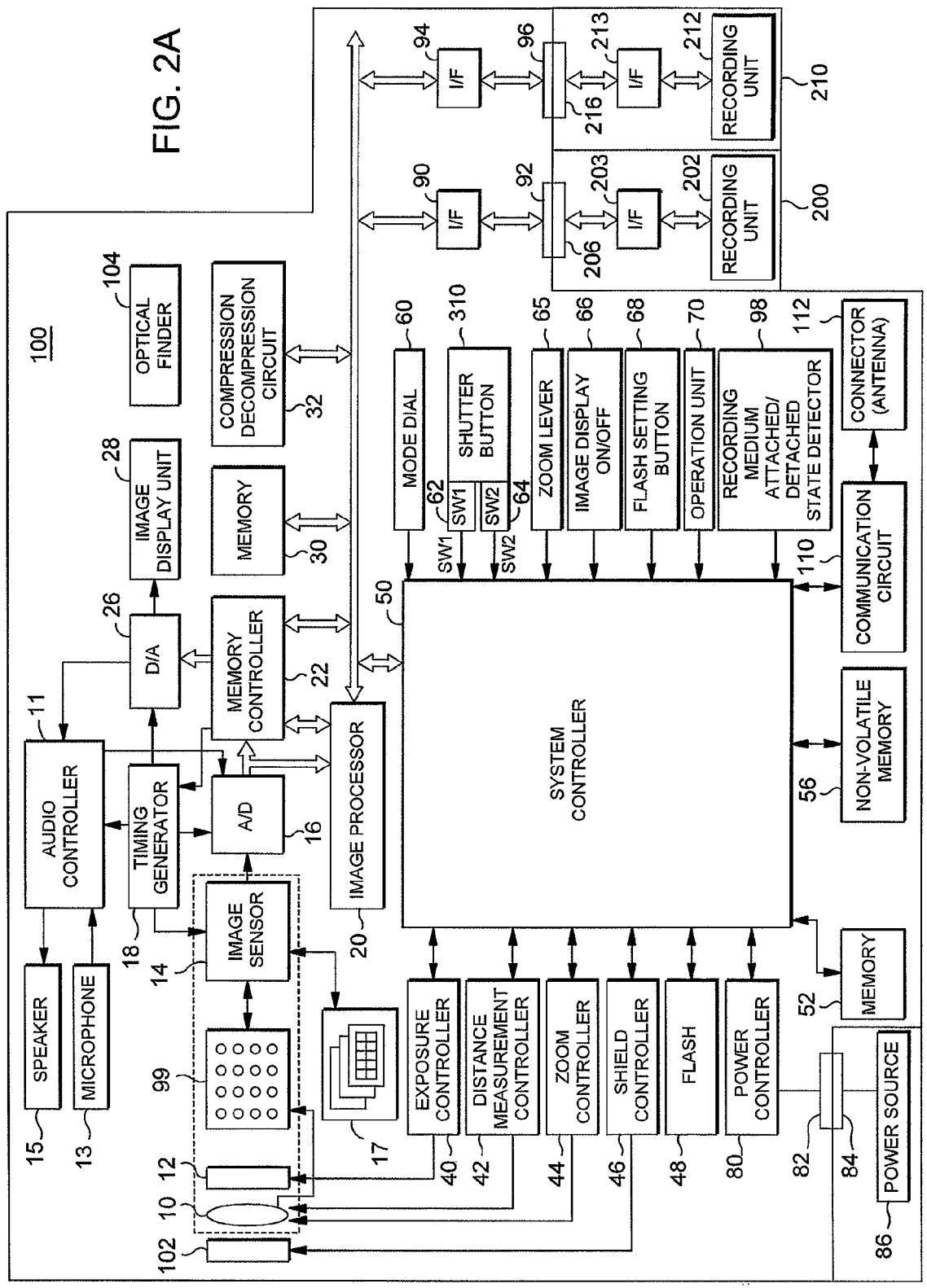

| FIG. 6A |
| FIG. 6B |

ADJUSTMENT OF IMAGING PROPERTIES FOR AN IMAGING ASSEMBLY HAVING LIGHT-FIELD OPTICS

FIELD

The present disclosure relates to light-field photography, and, more particularly, relates to adjustment of imaging properties of an imaging assembly having light-field optics.

BACKGROUND

Light-field photography captures a four-dimensional light field in a single photographic exposure. The light field is "four-dimensional" since it captures information in two spatial dimensions and two angular dimensions. Post-processing of the light field allows synthesis of images not possible with ordinary photography, such as images with focus that varies, aperture that varies, perspective that varies, and the like.

Ordinary RGB image capture is capable of capturing image data such that three spectral bands are assigned for each pixel of the image, and thus each pixel has three spectral components. Multi-spectral image capture is capable of capturing image data such that four or more spectral bands are assigned for each pixel of the image, such as capture of blue, green, yellow, orange and red channels for each pixel. In such an example, each pixel has five components.

SUMMARY

Recently, imaging assemblies have been developed in which the imaging assemblies have a tunable spectral response. Such imaging assemblies are described in U.S. application Ser. No. 12/871,826, by Francisco Imai, entitled "Image Capture With Region-Based Adjustment Of Imaging Properties", U.S. application Ser. No. 12/949,592, by Francisco Imai, entitled "Adaptive Spectral Imaging By Using An Imaging Assembly With Tunable Spectral Sensitivities", U.S. application Ser. No. 13/033,578, by Francisco Imai, entitled "Image Capture And Post-Capture Processing", U.S. application Ser. No. 12/859,115, by Francisco Imai, entitled "Image Capture With Identification Of Illuminant", and U.S. application Ser. No. 12/949,566, by Francisco Imai, entitled "Adaptive Spatial Sampling Using An Imaging Assembly Having A Tunable Spectral Response", the contents of which are incorporated by reference herein. In particular, U.S. application Ser. No. 12/949,592 describes a tunable imaging assembly that is capable of capturing four or more spectral bands for each pixel.

The inventor herein has proposed light-field image capture by using an imaging assembly that has light-field optics for projecting a light-field of a scene onto the imaging assembly, in U.S. application Ser. No. 13/073,634, by Francisco Imai, entitled "Multi-Modal Image Capture", the contents of which are incorporated by reference herein.

The disclosure herein proposes image capture using an imaging assembly that has light-field optics in accordance with designated capture preferences, such that image properties are adjusted during the capture process.

According to an aspect of the disclosure herein, an image capture device includes an imaging assembly having a spectral sensitivity tunable in accordance with a spectral capture mask, together with light-field optics for projecting a light-field of a scene onto the imaging assembly. A first spectral capture mask is applied to the imaging assembly and preview image data of a scene is captured under the first capture mask. A designation of a region of interest, and a designation of a capture preference in the region of interest are received. A second spectral capture mask is calculated by calculations which use the preview image data and the capture preference for the region of interest. The second spectral capture mask is applied to the imaging assembly, and light-field image data of the scene is captured under the second spectral capture mask.

By virtue of the foregoing arrangement, light-field image data can be captured in accordance with a designated capture preference for a designated region of interest, as compared to image capture based on automatic image analysis and correction.

In another example embodiment described herein, the capture preference includes at least one selected from the group which includes color, brightness, focus and sharpness. The preview image data is displayed, the region of interest is a region of the displayed preview image data, the region of interest is user-designated, and the capture preference is user-designated.

By virtue of the foregoing arrangement, light-field image data can be captured in accordance with user-designated preference for color, brightness, focus and sharpness for user-designated regions of a scene. Moreover, by virtue of capturing the image in accordance with such user-designated preference, less image data may be captured, as compared to an amount of image data sufficient for rendering in accordance with user-designated preference received post-capture.

In another example embodiment described herein, the imaging assembly has an image sensor which has a tunable spectral sensitivity that is tunable in accordance with the spectral capture mask. A light-field spatial selection mask is calculated by calculations which use the capture preference for the region of interest. The light-field spatial selection mask is applied to the light-field optics of the imaging assembly, the second spectral capture mask is applied to the image sensor of the imaging assembly, and light-field image data of the scene is captured under the light-field spatial selection mask and the second spectral capture mask.

In yet another example embodiment described herein, the light-field optics comprise multi-aperture light-field optics. Different apertures of the multi-aperture light-field optics are managed in units of super-pixels, each super-pixel is comprised of a group of pixels, and each pixel has a different aperture. A user-selection of a focus is determined from the received capture preference. For each super-pixel, an aperture of the super-pixel is selected in accordance with the user-selection of the focus, and image capture is performed in accordance with the selected aperture.

This brief summary has been provided so that the nature of this disclosure may be understood quickly. A more complete understanding can be obtained by reference to the following detailed description and to the attached drawings.

BRIEF DESCRIPTION OF THE DRAWINGS

FIGS. 2A and 2B are detailed block diagrams for explaining the internal architecture of the image capture device shown in FIG. 1 according to an example embodiment.

DETAILED DESCRIPTION

In the following example embodiments, there is described a digital camera which may be a digital still camera or a digital video camera. It is understood, however, that the following description encompasses arbitrary arrangements which can incorporate or utilize imaging assemblies having a spectral response which is tunable in accordance with a capture parameter, such as a data processing apparatus having an image sensing function (e.g., a personal computer) or a portable terminal having an image sensing function (e.g., a mobile telephone).

Figure 1A:
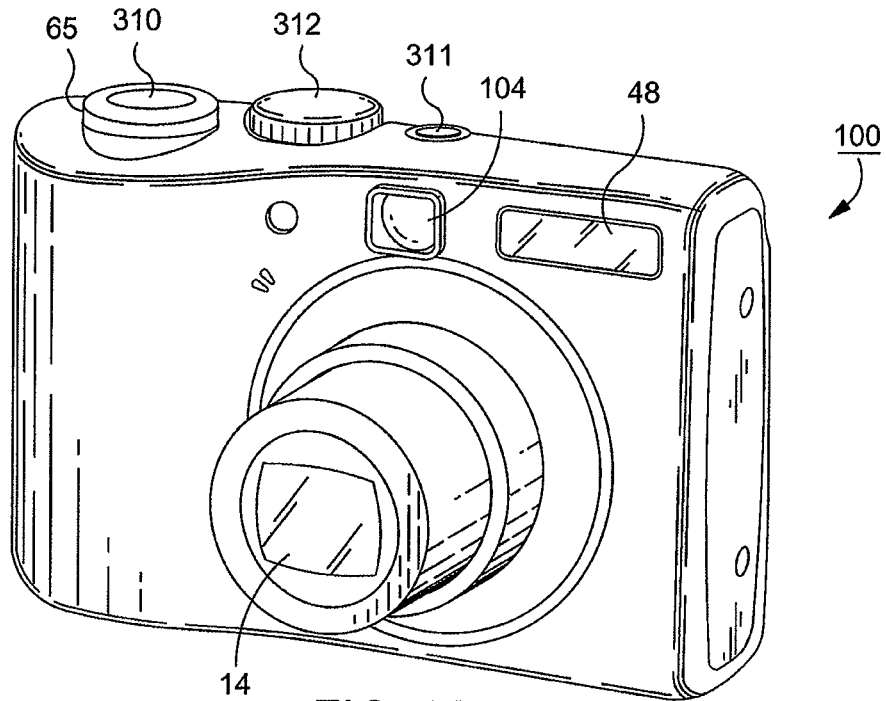
FIGS. 1A and 1B are views depicting an external appearance of an image capture device according to an example embodiment.
Figure 1B:
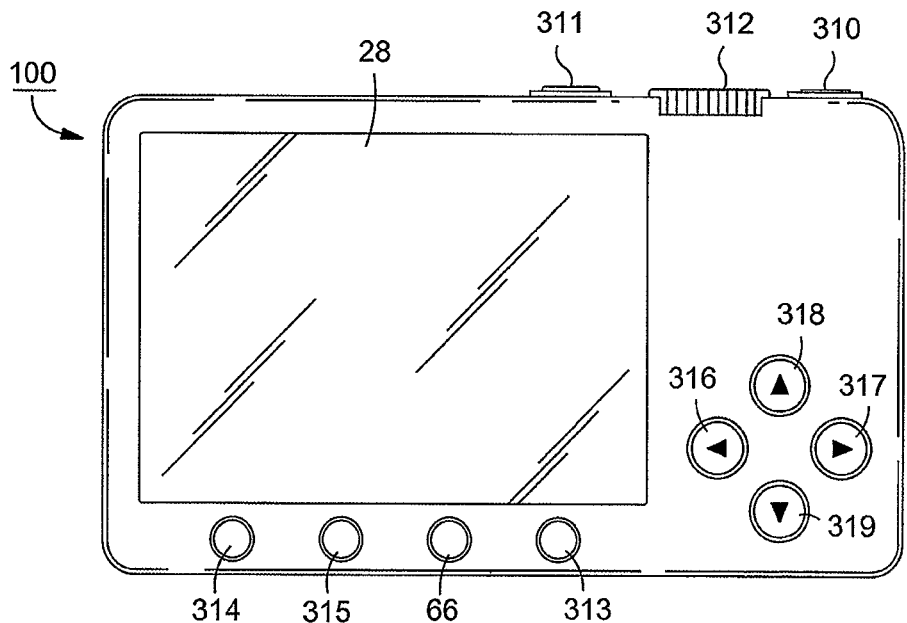

FIGS. 1A and 1B are views showing an example of an external appearance of an image capture device 100 according to an example embodiment. It should be noted that in these figures, some components are omitted for conciseness. A user operates buttons and switches for turning ON/OFF the power of the digital camera 100, for setting, changing or confirming the shooting parameters, for confirming the status of the camera, for confirming shot images, and so on.

Optical finder 104 is a viewfinder, through which a user can view a scene to be captured. In this embodiment optical finder 104 is separate from image display unit 28, but in some embodiments image display unit 28 may also function as a viewfinder.

Flash (flash emission device) 48 is for emitting auxiliary light to illuminate a scene to be captured, if necessary.

Image sensor 14 is an image sensor which converts an optical image into an electrical signal. In this embodiment, image sensor 14 is a multi-spectral image sensor with a spectral response which is tunable in accordance with a capture mask to capture multi-spectral image data. Image sensor 14 will be described more fully below with respect to FIG. 2A.

The power button 311 is provided to start or stop the digital camera 100, or to turn ON/OFF the main power of the digital camera 100. The menu button 314 is provided to display the setting menu such as shooting parameters and operation modes of the digital camera 100, and to display the status of the digital camera 100. The menu includes selectable items or items whose values are variable.

A delete button 313 is pressed for deleting an image displayed on a playback mode or a shot-image confirmation screen. In the present embodiment, the shot-image confirmation screen (a so-called quick review screen) is provided to display a shot image on the image display unit 28 immediately after shooting for confirming the shot result. Furthermore, the present embodiment is constructed in a way that the shot-image confirmation screen is displayed as long as a user keeps pressing the shutter button 310 after the user instructs shooting by shutter button depression.

An enter button 315 is pressed for selecting a mode or an item. When the enter button 315 is pressed, a system controller 50 (shown in FIG. 2A) sets the mode or item selected at this time. The display ON/OFF button 66 is used for selecting displaying or non-displaying of photograph information regarding the shot image, and for switching the image display unit 28 to be functioned as an electronic view finder.

A left button 316, a right button 317, an up button 318, and a down button 319 may be used for the following purposes, for instance, changing an option (e.g., items, images) selected from plural options, changing an index position that specifies a selected option, and increasing or decreasing numeric values (e.g., correction value, date and time).

Half-stroke of the shutter button 310 instructs the system controller 50 to start, for instance, AF processing, AE processing, AWB processing, EF processing or the like. Full-stroke of the shutter button 310 instructs the system controller 50 to perform shooting.

The zoom operation unit 65 is operated by a user for changing the angle of view (zooming magnification or shooting magnification). A recording/playback selection switch 312 is used for switching a recording mode to a playback mode, or switching a playback mode to a recording mode.

FIG. 2A is a block diagram showing an example of the arrangement of the digital camera 100 as an image capture device according to this embodiment. Referring to FIG. 2A, reference numeral 10 denotes an imaging lens; 12, a shutter having an aperture function; and 14, an image sensor which has a spectral response which is tunable in accordance with a capture parameter, and which converts an optical image into an electrical signal. In FIG. 2A, an imaging assembly is comprised of image sensor 14 and associated optics, such that in some embodiments the imaging assembly is comprised of image sensor 14 and lens 10. Reference numeral 16 denotes an A/D converter which converts an analog signal into a digital signal. The A/D converter 16 is used when an analog signal output from the image sensor 14 is converted into a digital signal and when an analog signal output from an audio controller 11 is converted into a digital signal. Reference numeral 102 denotes a shield, or barrier, which covers the image sensor including the lens 10 of the digital camera 100 to prevent an image capturing system including the lens 10, shutter 12, and image sensor 14 from being contaminated or damaged.

Light-field information gathering unit 99 captures light-field information. Light-field information gathering unit 99 might comprise light-field optics arranged to project light-field information of a scene onto image sensor 14. Examples of such optics include multi-aperture optics, polydioptric optics, and a plenoptic system. Light-field information differs from simple image data in that image data is merely a two-dimensional representation of the total amount of light at each pixel of an image, whereas light-field information also includes information concerning the directional lighting distribution at each pixel. In some usages, light-field information is sometimes referred to as four-dimensional. In the present embodiment, the array of lenses or other hardware for light-field information gathering unit 99 may be arranged on top of each tunable pixel (or groups thereof), and different apertures of the different lenses may be managed in units of super-pixels, as discussed more fully below.

In the present embodiment, imaging lens 10, shutter 12, image sensor 14 and light-field information gathering unit 99 function together to act as a light-field gathering assembly which gathers light-field information of a scene in a single capture operation.

Optical system 10 may be of a zoom lens, thereby providing an optical zoom function. The optical zoom function is realized by driving a magnification-variable lens of the optical system 10 using a driving mechanism of the optical system 10 or a driving mechanism provided on the main unit of the digital camera 100.

A light beam (light beam incident upon the angle of view of the lens) from an object that goes through the imaging lens (image sensing lens) 10 passes through an opening of the shutter 12 having a diaphragm function, into light-field information gathering unit 99, and forms an optical image of the object on the image sensing surface of the image sensor 14. The image sensor 14 converts the optical image to analog image signals and outputs the signals to an A/D converter 16. The A/D converter 16 converts the analog image signals to digital image signals (image data). The image sensor 14 and the A/D converter 16 are controlled by clock signals and control signals provided by a timing generator 18. The timing generator 18 is controlled by a memory controller 22 and a system controller 50.

Image sensor 14 is a multi-spectral image sensor which has a spectral response (e.g., spectral responsivity) which is tunable in accordance with a capture parameter 17. The spectral responsivity for each pixel is tunable based on a capture parameter, such as a capture parameter in an arrayed mask of capture parameter(s) 17 arranged in correspondence to the array of pixels. Accordingly, capture parameter 17 may be applied as a grid-like spatial capture mask, for example when a shutter is half pressed. As such, spectral responses can be adjusted in accordance with capture parameters in the mask. In this embodiment, capture parameter 17 may be comprised of multiple spatial masks, with one mask each for each channel of information output by image sensor 14.

In one example, image sensor 14 may capture multi-spectral or high-resolution spectral data, i.e., may output four or more channels of color information for each pixel, including a red-like channel, a green-yellow-like channel, a green-like channel, a blue-green-like channel, and a blue-like channel. Thus, in this example, capture parameter 17 includes a spatial mask DR for the red-like channel of information, a spatial mask DGY for the green-yellow-like channel of information, a spatial mask DG for the green-like channel of information, a spatial mask DBG for the blue-green-like channel of information and a spatial mask DB for the blue-like channel of information. Each spatial mask comprises an array of control parameters corresponding to pixels or regions of pixels in image sensor 14. The spectral responsivity of each pixel, or each region of plural pixels, is thus tunable individually and independently of other pixels or regions of pixels. In that regard, image sensor 14 may be comprised of a transverse field detector (TFD) sensor, and spatial masks DR, DGY, DG, DBG and DB may correspond to voltage biases applied to control electrodes of the TFD sensor.

Further examples of aspects of tunable image sensor arrangements are described in U.S. application Ser. No. 12/949,592, filed Nov. 18, 2010, titled "Adaptive Spectral Imaging By Using An Imaging Assembly With Tunable Spectral Sensitivities", by Francisco Imai, in U.S. application Ser. No. 12/859,115, filed Aug. 18, 2010, titled "Image Capture With Identification Of Illuminant", by Francisco Imai, and in U.S. application Ser. No. 12/871,826, filed Aug. 30, 2010, titled "Image Capture With Region-Based Adjustment Of Imaging Properties", by Francisco Imai, the contents of which are incorporated by reference herein.

In the embodiment herein, the image sensor 14 is not preceded by a color filter array (CFA). In that regard, a CFA is one method to capture spectral data. An example of such a CFA is described in U.S. Pat. No. 6,226,034 (Katayama), the contents of which are incorporated by reference herein. However, the use of a CFA may lead to a number of disadvantages. For example, CFAs often have low sensitivity, so a significant amount of signals (data) can be lost. Additionally, the inclusion of any filter necessarily decreases the signal-to-noise ratio by filtering the amount of light incident on the image sensor. Moreover, implementing a CFA for each pixel can be prohibitively expensive and may not be physically possible, particularly in smaller cameras.

Reference numeral 18 denotes a timing generator, which supplies clock signals and control signals to the image sensor 14, the audio controller 11, the A/D converter 16, and a D/A converter 26. The timing generator 18 is controlled by a memory controller 22 and system controller 50. Reference numeral 20 denotes an image processor, which applies resize processing such as predetermined interpolation and reduction, and color conversion processing to data from the A/D converter 16 or that from the memory controller 22. The image processor 20 executes predetermined arithmetic processing using the captured image data, and the system controller 50 executes exposure control and ranging control based on the obtained arithmetic result.

As a result, TTL (through-the-lens) AF (auto focus) processing, AE (auto exposure) processing, and EF (flash pre-emission) processing are executed. The image processor 20 further executes predetermined arithmetic processing using the captured image data, and also executes TTL AWB (auto white balance) processing based on the obtained arithmetic result. It is understood that in other embodiments, optical finder 104 may be used in combination with the TTL arrangement, or in substitution therefor.

Output data from the A/D converter 16 is written in a memory 30 via the image processor 20 and memory controller 22 or directly via the memory controller 22. The memory 30 stores image data which is captured by the image sensor 14 and is converted into digital data by the A/D converter 16, and image data to be displayed on an image display unit 28. The image display unit 28 may be a liquid crystal screen. Note that the memory 30 is also used to store audio data recorded via a microphone 13, still images, movies, and file headers upon forming image files. Therefore, the memory 30 has a storage capacity large enough to store a predetermined number of still image data, and movie data and audio data for a predetermined period of time.

A compression/decompression unit 32 compresses or decompresses image data by adaptive discrete cosine transform (ADCT) or the like. The compression/decompression unit 32 loads captured image data stored in the memory 30 in response to pressing of the shutter 310 as a trigger, executes the compression processing, and writes the processed data in the memory 30. Also, the compression/decompression unit 32 applies decompression processing to compressed image data loaded from a detachable recording unit 202 or 212, and writes the processed data in the memory 30. Likewise, image data written in the memory 30 by the compression/decompression unit 32 is converted into a file by the system controller 50, and that file is recorded in the recording unit 202 or 212.

The memory 30 also serves as an image display memory (video memory). Reference numeral 26 denotes a D/A converter, which converts image display data stored in the memory 30 into an analog signal, and supplies that analog signal to the image display unit 28. Reference numeral 28 denotes an image display unit, which makes display according to the analog signal from the D/A converter 26 on the liquid crystal screen 28 of an LCD display. In this manner, image data to be displayed written in the memory 30 is displayed by the image display unit 28 via the D/A converter 26.

The exposure controller 40 controls the shutter 12 having a diaphragm function based on the data supplied from the system controller 50. The exposure controller 40 may also have a flash exposure compensation function by linking up with a flash (flash emission device) 48. The flash 48 has an AF auxiliary light projection function and a flash exposure compensation function.

The distance measurement controller 42 controls a focusing lens of the optical system 10 based on the data supplied from the system controller 50. A zoom controller 44 controls zooming of the optical system 10. A shield controller 46 controls the operation of a shield (barrier) 102 to protect the optical system 10.

Reference numeral 13 denotes a microphone. An audio signal output from the microphone 13 is supplied to the A/D converter 16 via the audio controller 11 which includes an amplifier and the like, is converted into a digital signal by the A/D converter 16, and is then stored in the memory 30 by the memory controller 22. On the other hand, audio data is loaded from the memory 30, and is converted into an analog signal by the D/A converter 26. The audio controller 11 drives a speaker 15 according to this analog signal, thus outputting a sound.

A nonvolatile memory 56 is an electrically erasable and recordable memory, and uses, for example, an EEPROM. The nonvolatile memory 56 stores constants, computer-executable programs, and the like for operation of system controller 50. Note that the programs include those for execution of various flowcharts.

Figure 2B:
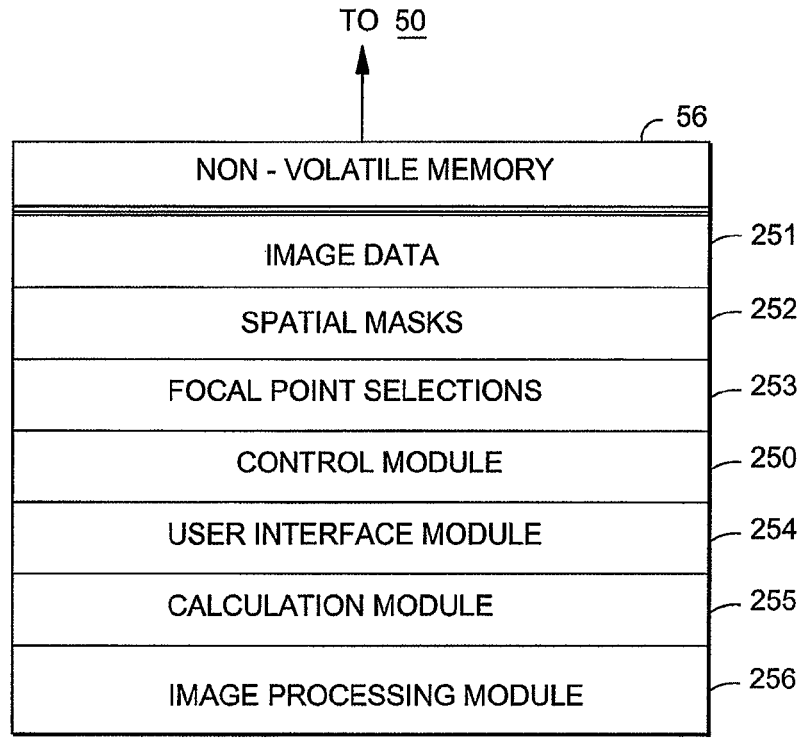

In particular, as shown in FIG. 2B, non-volatile memory 56 is an example of a non-transitory computer-readable memory medium, having retrievably stored thereon image processing module 256 as described herein. According to this example embodiment, the image processing module 256 is constructed to capture multi-spectral image data with an image sensor of the image capture apparatus. The image sensor has a tunable spectral response that is tunable in accordance with a capture mask. Image processing module 256 is also constructed to control light-field optics for projecting light-field information of a scene. The light-field information is projected onto the image sensor. This module will be discussed in more detail below with respect to FIG. 4.

Additionally, as shown in FIG. 2B, non-volatile memory 56 also includes image data 251, which includes image data from a scene. Non-volatile memory 56 may also store capture parameter(s) 17 for application to image sensor 14 so as to control spectral responsivity of the imaging assembly. In this embodiment, such capture parameters are stored as a capture mask in spatial masks 252, which control spectral responsivity of the image sensor so as to permit pixel-by-pixel or region-by-region control of spectral responsivity, independently of other pixels or regions. Non-volatile memory 56 may further store focal point selections 253, and the focal point selections in turn may be used to set one or more apertures for the light-field optics, as discussed more fully below. In that regard, focal point selections 253 may be used to generate a light-field spatial selection mask which is independent of the capture mask and which may be used to set apertures for the light-field optics, and this light-field spatial selection mask can also be stored in spatial masks 252.

Additionally, as shown in FIG. 2B, non-volatile memory 56 also includes user interface module 254. User interface module 254 is constructed to display a user interface which includes a preview image based on captured preview image data of a scene. User interface module 254 is also constructed to accept a user designation of a region of interest (ROI) in the preview image, via user manipulation of the user interface.

User interface module 254 is constructed to accept a user selection of a targeted imaging property for the ROI, also via user manipulation of the user interface. In the example embodiment, the user interface module 254 includes a brightness adjustment module, a color adjustment module, and a focus/sharpness adjustment module.

In the example embodiment, the brightness adjustment module accepts a user selection of a target range for brightness for the ROI by displaying on the user interface a brightness range of the preview image data and accepting a user manipulation of the brightness range. According to this example embodiment, the brightness range of the preview image data is displayed on the user interface as a brightness histogram.

In the example embodiment, the color adjustment module accepts a user selection of a target range for color balance for the ROI by displaying on the user interface color channel ranges of the preview image data and accepting a user manipulation of the color channel ranges. According to this example embodiment, the color channel ranges of the preview image data are displayed on the user interface as color channel histograms.

In the example embodiment, the focus/sharpness adjustment module accepts a user selection of a target focal length for the ROI by displaying on the user interface a focal length of the preview image data and accepting a user manipulation of the focal length. According to this example embodiment, the focal length of the preview image data is indicated by a slide bar that is displayed on the user interface.

Calculation module 255 is constructed to compute the revised capture setting for the spectral responsivity of the tunable image sensor 14, by revising the default capture setting based on the targeted imaging properties for the ROI as selected by the user. In this embodiment, the revised capture setting comprises an electronic spatial mask.

Generally, calculation module 255 receives the targeted imaging property for the ROI from user interface module 254 and obtains original parameters for the designated ROI in order to revise the capture setting. The original parameters are statistical values of the imaging properties that characterize the ROI before adjustment by the user. For example, the original imaging property values may be a median of the brightness values or a median of the RGB values for the designated ROI. In this example embodiment, the original imaging property values are previously stored by the image capture device 100 when image processing module 256 captures image data of a scene from the image sensor 14, for example, in memory 56. In this case, calculation module 255 accesses memory 56 in order to obtain the original parameters for the ROI.

In the case that the targeted imaging property is a brightness value, the calculation module is constructed to revise the default capture setting based on the target range for brightness for the ROI as selected by the user. In this case, the calculation module computes a brightness change parameter based on a comparison of the obtained original brightness values with the target range of brightness as selected by the user, and combines the brightness change parameter with the default capture setting so as to compute the revised capture setting. More specifically, the brightness change parameter is computed, for example, by calculating a difference between the original brightness values in the preview image data and the target range of brightness for the ROI as selected by the user. In an example embodiment, the brightness change parameter is associated with a bias voltage for the electronic spatial mask. For example, the brightness change parameter is associated with the bias voltage by using a lookup table. Of course, any other suitable method of association may be used, including for example, by providing a module which generates the appropriate bias voltages based on the brightness change parameter.

In the case that the targeted imaging property is a color balance value, the calculation module is constructed to revise the default capture setting based on the target range for color balance for the ROI as selected by the user. In this case, the calculation module computes color change parameters based on a comparison of the obtained original color channel values with the target color balance as selected by the user, and combines the color change parameters with the default capture setting so as to compute the revised capture setting. More specifically, the color change parameters are computed, for example, by calculating a difference between the original color channel values in the preview image data and the target color balance for the ROI as selected by the user. In an example embodiment, the color change parameters are associated with bias voltages for the electronic spatial mask. For example, the color change parameters are associated with bias voltages by using a lookup table. Of course, any other suitable method of association may be used, including for example, by providing a module which generates the appropriate bias voltages based on the color change parameters.

In the example embodiment, calculation module 255 is also constructed to compute the revised capture setting for the light-field optics, based on the targeted focal length for the ROI, as selected by the user. In this embodiment, the revised capture setting comprises a light-field spatial selection mask, and the light-field optics comprise multi-aperture light-field optics. Different apertures of the multi-aperture light-field optics are managed in units of super-pixels, wherein each super-pixel is comprised of a group of pixels, and each pixel has a different aperture. For each super-pixel, calculation module 255 selects an aperture of the super-pixel, based on calculations that use the user-selected targeted focal length for each user-selected ROI. Calculation module 255 uses the selected apertures to generate a revised light-field spatial selection mask.

In some example embodiments, image processing module 256 further includes a determination module (not shown) constructed to determine whether a user has or has not designated the ROI on the displayed preview image. According to these embodiments, responsive to a determination that the user has not designated the ROI, the image processing module 256 is constructed to capture image data using the revised capture setting, and to store the captured image data. On the other hand, responsive to a determination that the user has designated the ROI, the user interface module is constructed to accept a second user selection of a targeted imaging property for the ROI. In this situation, the calculation module is constructed to compute a second revised capture setting for the spectral responsivity of the tunable imaging assembly based on the targeted imaging property for the ROI as selected by the user, and the setting module is constructed to apply the second revised capture setting to the tunable image sensor setting for setting the spectral response of the tunable imaging assembly to the second revised capture setting.

Control module 250 is constructed to control the image capture device 100 to apply a first spectral capture mask to the imaging assembly, capture preview image data of a scene under the first capture mask by using the image processing module 256, receive a designation of a region of interest from user interface module 254, receive a designation of a capture preference in the region of interest from using interface module 254, calculate a second spectral capture mask by calculations which use the preview image data and the capture preference for the region of interest by using calculation module 255, apply the second spectral capture mask to the imaging assembly, and capture light-field image data of the scene under the second spectral capture mask by using the image processing module 256.

Reference numeral 50 denotes a system controller, which controls the entire digital camera 100. The system controller 50 executes programs recorded in the aforementioned nonvolatile memory 56 to implement respective processes to be described later of this embodiment. Reference numeral 52 denotes a system memory which comprises a RAM. On the system memory 52, constants and variables required to operate system controller 50, programs read out from the nonvolatile memory 56, and the like are mapped.

A mode selection switch 60, shutter switch 310, and operation unit 70 form operation means used to input various operation instructions to the system controller 50.

The mode selection switch 60 includes the imaging/playback selection switch, and is used to switch the operation mode of the system controller 50 to one of a still image recording mode, movie recording mode, playback mode, and the like.

The shutter switch 62 is turned on in the middle of operation (half stroke) of the shutter button 310 arranged on the digital camera 100, and generates a first shutter switch signal SW1. Also, the shutter switch 64 is turned on upon completion of operation (full stroke) of the shutter button 310, and generates a second shutter switch signal SW2. The system controller 50 starts the operations of the AF (auto focus) processing, AE (auto exposure) processing, AWB (auto white balance) processing, EF (flash pre-emission) processing, and the like in response to the first shutter switch signal SW1. Also, in response to the second shutter switch signal SW2, the system controller 50 starts a series of processing (shooting) including the following: processing to read image signals from the image sensor 14, convert the image signals into image data by the A/D converter 16, process the image data by the image processor 20, and write the data in the memory 30 through the memory controller 22; and processing to read the image data from the memory 30, compress the image data by the compression/decompression circuit 32, and write the compressed image data in the recording medium 200 or 210.

A zoom operation unit 65 is an operation unit operated by a user for changing the angle of view (zooming magnification or shooting magnification). The operation unit 65 can be configured with, e.g., a slide-type or lever-type operation member, and a switch or a sensor for detecting the operation of the member.

The image display ON/OFF switch 66 sets ON/OFF of the image display unit 28. In shooting an image with the optical finder 104, the display of the image display unit 28 configured with a TFT, an LCD or the like may be turned off to cut the power supply for the purpose of power saving.

The flash setting button 68 sets and changes the flash operation mode. In this embodiment, the settable modes include: auto, flash-on, red-eye reduction auto, and flash-on (red-eye reduction). In the auto mode, flash is automatically emitted in accordance with the lightness of an object. In the flash-on mode, flash is always emitted whenever shooting is performed. In the red-eye reduction auto mode, flash is automatically emitted in accordance with lightness of an object, and in case of flash emission the red-eye reduction lamp is always emitted whenever shooting is performed. In the flash-on (red-eye reduction) mode, the red-eye reduction lamp and flash are always emitted.

The operation unit 70 comprises various buttons, touch panels and so on. More specifically, the operation unit 70 includes a menu button, a set button, a macro selection button, a multi-image reproduction/repaging button, a single-shot/ serial shot/self-timer selection button, a forward (+) menu selection button, a backward (−) menu selection button, and the like. Furthermore, the operation unit 70 may include a forward (+) reproduction image search button, a backward (−) reproduction image search button, an image shooting quality selection button, an exposure compensation button, a date/time set button, a compression mode switch and the like.

In one embodiment, operation unit 70 may comprise hardware for implementing a touchscreen user interface, as shown, for example, in FIGS. 5A to 5E. Specifically, a user interface on image display unit 28 may be constructed to accept a user designation of a region of interest (ROI) in the preview image, via user manipulation of the user interface, as well as to accept a user adjustment of brightness, color and focus. According to one example embodiment, image display unit 28 may further display a user interface for accepting a user selection of an additional region, and a controller may affect a re-adjustment based on the additional selection. In this way, the touchscreen allows the user to dynamically select different regions of the preview image to adjust brightness, color and focus. Of course, the touchscreen user interface could also be used for other selections and commands.

The compression mode switch is provided for setting or selecting a compression rate in JPEG (Joint Photographic Expert Group) compression, recording in a RAW mode and the like. In the RAW mode, analog image signals outputted by the image sensing device are digitalized (RAW data) as it is and recorded.

Note in the present embodiment, RAW data includes not only the data obtained by performing A/D conversion on the photoelectrically converted data from the image sensing device, but also the data obtained by performing lossless compression on A/D converted data. Moreover, RAW data indicates data maintaining output information from the image sensing device without a loss. For instance, RAW data is A/D converted analog image signals which have not been subjected to white balance processing, color separation processing for separating luminance signals from color signals, or color interpolation processing. Furthermore, RAW data is not limited to digitalized data, but may be of analog image signals obtained from the image sensing device.

According to the present embodiment, the JPEG compression mode includes, e.g., a normal mode and a fine mode. A user of the digital camera 100 can select the normal mode in a case of placing a high value on the data size of a shot image, and can select the fine mode in a case of placing a high value on the quality of a shot image.

In the JPEG compression mode, the compression/decompression circuit 32 reads image data written in the memory 30 to perform compression at a set compression rate, and records the compressed data in, e.g., the recording medium 200.

In the RAW mode, analog image signals are read in units of line in accordance with the pixel arrangement of the color filter of the image sensor 14, and image data written in the memory 30 through the A/D converter 16 and the memory controller 22 is recorded in the recording medium 200 or 210.

Note that the digital camera 100 according to the present embodiment has a plural-image shooting mode, where plural image data can be recorded in response to a single shooting instruction by a user. Image data recording in this mode includes image data recording typified by an auto bracket mode, where shooting parameters such as white balance and exposure are changed step by step. It also includes recording of image data having different post-shooting image processing contents, for instance, recording of plural image data having different data forms such as recording in a JPEG form or a RAW form, recording of image data having the same form but different compression rates, and recording of image data on which predetermined image processing has been performed and has not been performed.

A power controller 80 comprises a power detection circuit, a DC-DC converter, a switch circuit to select the block to be energized, and the like. The power controller 80 detects the existence/absence of a power source, the type of the power source, and a remaining battery power level, controls the DC-DC converter based on the results of detection and an instruction from the system controller 50, and supplies a necessary voltage to the respective blocks for a necessary period. A power source 86 is a primary battery such as an alkaline battery or a lithium battery, a secondary battery such as an NiCd battery, an NiMH battery or an Li battery, an AC adapter, or the like. The main unit of the digital camera 100 and the power source 86 are connected by connectors 82 and 84 respectively comprised therein.

The recording media 200 and 210 comprise: recording units 202 and 212 that are configured with semiconductor memories, magnetic disks and the like, interfaces 203 and 213 for communication with the digital camera 100, and connectors 206 and 216. The recording media 200 and 210 are connected to the digital camera 100 through connectors 206 and 216 of the media and connectors 92 and 96 of the digital camera 100. To the connectors 92 and 96, interfaces 90 and 94 are connected. The attached/detached state of the recording media 200 and 210 is detected by a recording medium attached/detached state detector 98.

Note that although the digital camera 100 according to the present embodiment comprises two systems of interfaces and connectors for connecting the recording media, a single or plural arbitrary numbers of interfaces and connectors may be provided for connecting a recording medium. Further, interfaces and connectors pursuant to different standards may be provided for each system.

For the interfaces 90 and 94 as well as the connectors 92 and 96, cards in conformity with a standard, e.g., PCMCIA cards, compact flash (CF) (registered trademark) cards and the like, may be used. In this case, connection utilizing various communication cards can realize mutual transfer/reception of image data and control data attached to the image data between the digital camera and other peripheral devices such as computers and printers. The communication cards include, for instance, a LAN card, a modem card, a USB card, an IEEE 1394 card, a P1284 card, an SCSI card, and a communication card for PHS or the like.

The optical finder 104 is configured with, e.g., a TTL finder, which forms an image from the light beam that has gone through the lens 10 utilizing prisms and mirrors. By utilizing the optical finder 104, it is possible to shoot an image without utilizing an electronic view finder function of the image display unit 28. The optical finder 104 includes indicators, which constitute part of the display device 54, for indicating, e.g., a focus state, a camera shake warning, a flash charge state, a shutter speed, an f-stop value, and exposure compensation.

A communication circuit 110 provides various communication functions such as USB, IEEE 1394, P1284, SCSI, modem, LAN, RS232C, and wireless communication. To the communication circuit 110, a connector 112 can be connected for connecting the digital camera 100 to other devices, or an antenna can be provided for wireless communication.

A real-time clock (RTC, not shown) may be provided to measure date and time. The RTC holds an internal power supply unit independently of the power supply controller 80, and continues time measurement even when the power supply unit 86 is OFF. The system controller 50 sets a system timer using a date and time obtained from the RTC at the time of activation, and executes timer control.

Figure 3A:
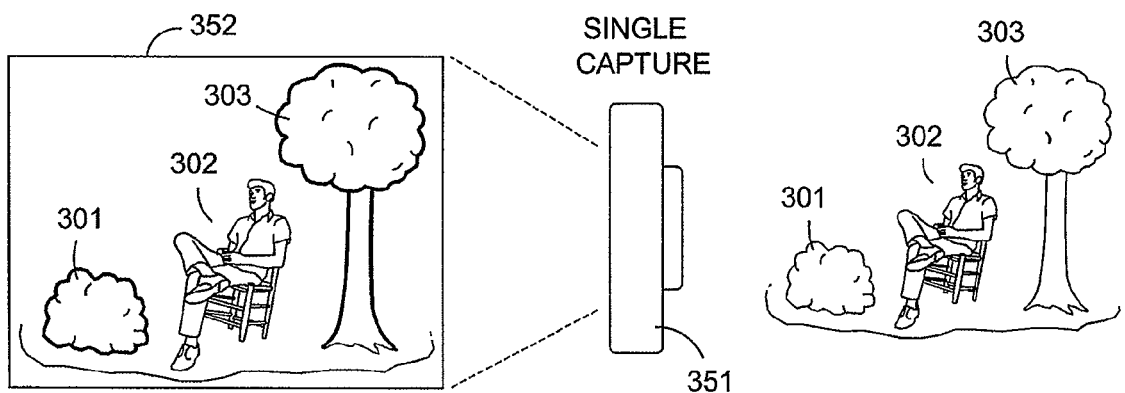
FIGS. 3A and 3B are representative views for explaining differences between simple pixel information and light-field information.
Figure 3B:
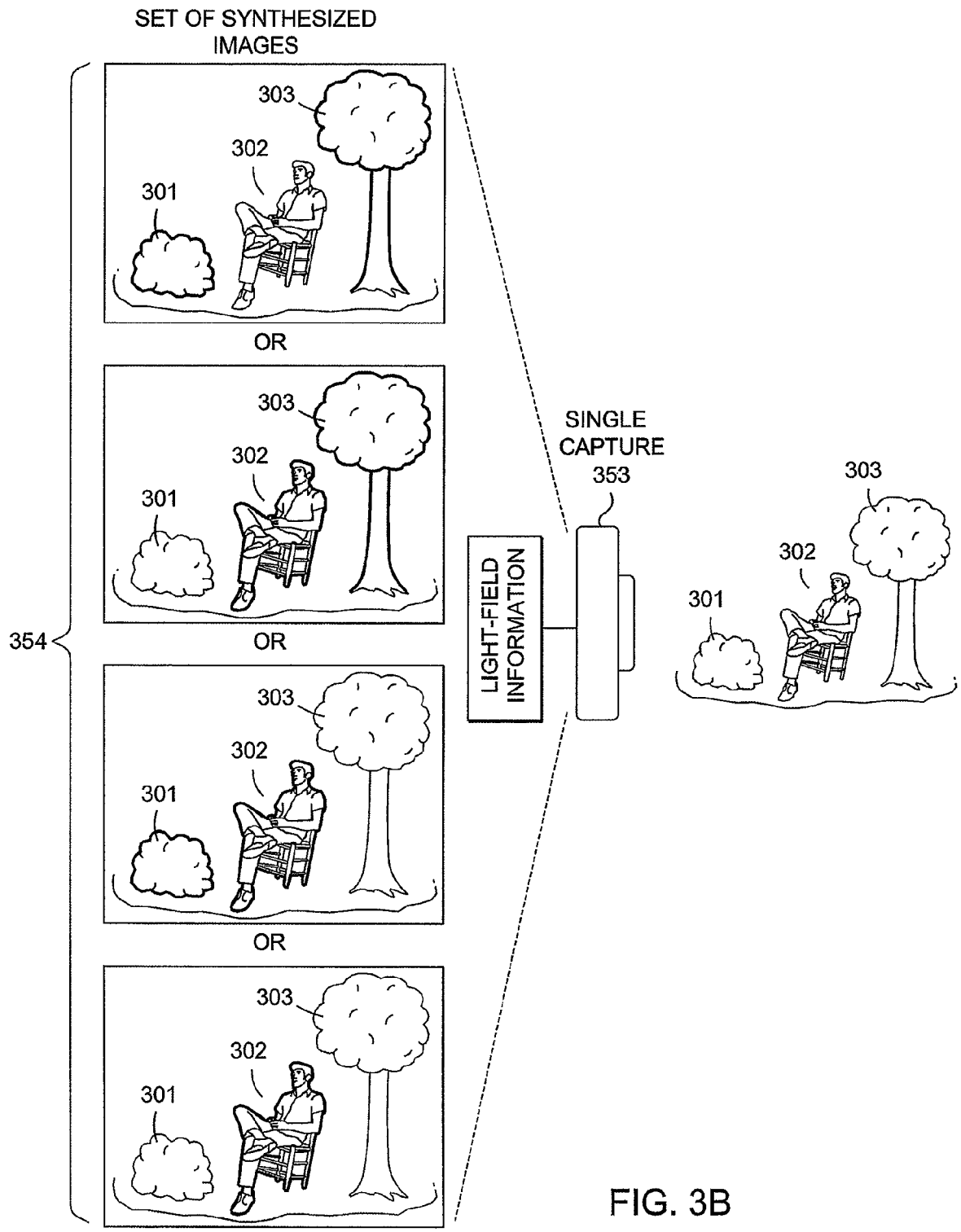

FIGS. 3A and 3B are representative views for explaining the differences between simple image data and light-field information. In particular, as discussed above, light-field information (e.g., such as that gathered by light-field gathering unit 99) differs from simple image data in that simple image data is merely a two-dimensional representation of the total amount of light at each pixel of an image, whereas light-field information also includes information concerning the directional lighting distribution at each pixel. In some usages, light-field information is sometimes referred to as four-dimensional. Using the light-field information, images at different focus positions and from different viewpoints can be obtained from a single capture operation.

In FIGS. 3A and 3B, a thick line is used to represent a blurry part of an image, whereas a normal line is used to represent a sharp or focused part of the image.

FIG. 3A is a view for explaining focus adjustment using a simple camera 351 to capture simple image data 352. As shown in FIG. 3A, in the image data 352 captured by simple camera 351, the seated man 302 is in focus, whereas the bush 301 and the tree 303 are not. Any objects out of the focus of the seated man 302, such as bush 301 and the tree 303, appear blurry.

However, image data captured by the image capture device 100 and displayed on the image display unit 28 may include regions where the preferable focus varies widely. In such cases, adjusting the focus globally, as in FIG. 3A, may result in certain areas of the image where the focus looks incorrect or not pleasing from an aesthetic point of view.

Thus, in contrast, FIG. 3B is a view for explaining adjustment using a light-field information capture device 353 to capture light-field information 354. The light field information capture device can be used to generate a scene identical to that shown in FIG. 3A. However, since the light-field information also captures images at different focus positions and from different viewpoints, the light-field information can also be used to generate synthesized images where the bush is in focus or where the tree is in focus, all from the same single capture operation. Additionally, the light-field information can be used to construct an image in which, for example, the bush 301 and tree 303 are in focus, but the seated man 302 is not, which would be impossible with a single capture of simple image data. Moreover, objects in the same range from the device (not shown) can have different focuses. Thus, multiple different focuses can be obtained using the light-field information.

Figure 4:
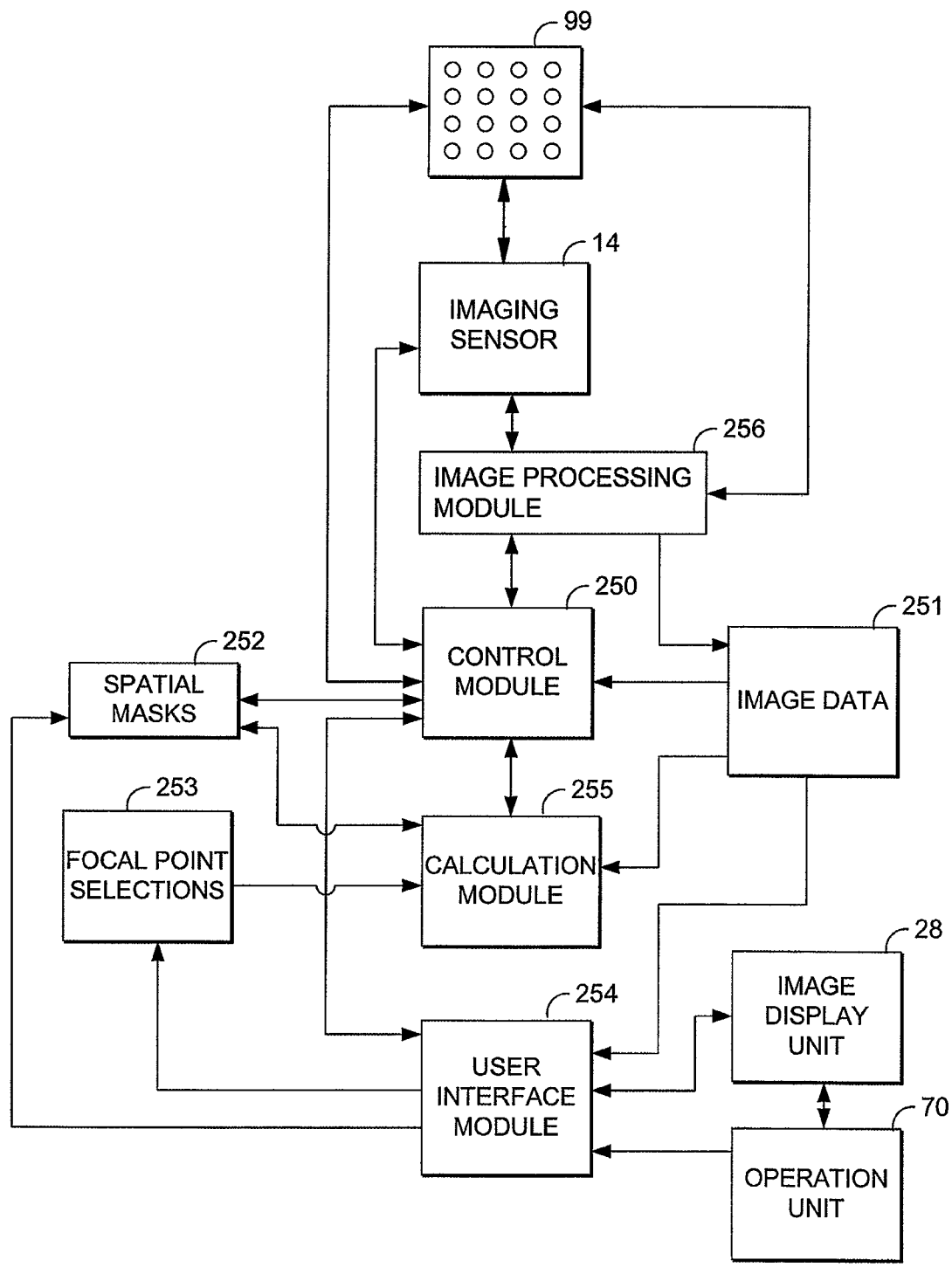
FIG. 4 is a view for explaining an image processing module according to one example embodiment.

FIG. 4 is a view for explaining an image processing module according to an example embodiment. As previously discussed with respect to FIG. 2B, image processing module 256 comprises computer-executable process steps stored on a non-transitory computer-readable storage medium, such as non-volatile memory 56. More or fewer modules may be used, and other architectures are possible.

Image processing module 256 captures multi-spectral image data with an image sensor of the image capture apparatus, such as imaging sensor 14. In this embodiment, image sensor 14 has a tunable spectral response and is tunable in accordance with a capture mask. Image processing module 256 communicates with non-volatile memory 56 to store the multi-spectral image data, for example as image data 251 shown in FIG. 2B. Image processing module 256 controls light-field optics to project light-field information of a scene. In particular, the light-field information is projected onto the image sensor. To that end, image processing module 256 communicates with light-field gathering assembly 99, which in turn is connected to image sensor 14 to gather light-field information of a scene in a single capture operation.

Control module 250 applies a spectral capture mask to image sensor 14 for setting the spectral response of the tunable image sensor 14. In the example embodiment, control module 250 also applies a light-field spatial selection mask to light-field gathering assembly 99 to effect selection of apertures of the light-field gathering assembly 99 that correspond to focal lengths selected by the user. Control module 250 captures preview image data of a scene under the applied spectral capture mask and the applied light-field spatial selection mask, by using the image processing module 256.

In other embodiments, rather than using the light-field spatial selection mask to change light-field gathering assembly 99 to select apertures of the light-field gathering assembly 99, the light-field spatial selection mask is used to change the spectral capture mask to decrease sensitivity values of pixels that are associated with apertures that do not correspond to focal lengths selected by the user. In particular, the sensitivity values of pixels that are associated with apertures that do not correspond to focal lengths selected by the user are set to low values such that these pixels provide low image signals after image capture. A lookup table (LUT), a mapping function, or the like, can be used to map apertures in a super-pixel with corresponding pixels. Based on this mapping, a determination can be made as to whether a pixel is associated with an aperture that does not correspond to focal lengths selected by the user.

User interface module 254 displays ROIs of the preview image, and displays capture preferences of the preview image, via image display unit 28. User interface module 254 receives a user designation of a displayed ROI and a user designation of a displayed capture preference in the ROI, via operation unit 70. In the example embodiment, various buttons are associated with operation unit 70, such as enter button 315, left button 316, right button 317, up button 318, and down button 319. The user designates a displayed ROI and a capture preference for the designated region of interest by operation of the buttons associated with operation unit 70. In the example embodiment, image display unit 28 is a touch screen display and it is also associated with operation unit 70 for receipt of user designation of a ROI and a corresponding capture preference. The user designates the ROI by touching the region of the image displayed on the image display unit 28, and the user designates a corresponding capture preference by touching the displayed capture preference. Control module 250 receives the user designated region of interest and the user-designated capture preference from user interface module 254.

Control module 250 calculates a revised spectral capture mask and a revised light-field spatial selection mask by using calculation module 255.

Figure 5A:
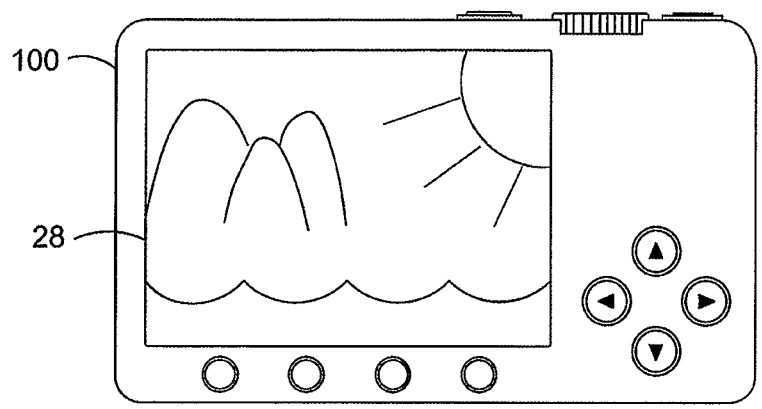
FIGS. 5A to 5E are views for explaining acceptance, by the image capture device shown in FIG. 1, of a selection of a targeted imaging property according to one example embodiment.

FIG. 5A is a view for explaining display of an image by the image capture device shown in FIG. 1 according to one example embodiment. In particular, a rear view of image capture device 100 having image display unit 28 is provided in FIG. 5A. According to this example embodiment, a user interface which includes a preview image based on captured image data of a scene is displayed on the image display unit 28.

In some example embodiments, the user interface includes ranges for imaging properties of the preview image, in addition to the preview image. In this case, the imaging property ranges for the preview image, such as histograms or slide bars, are displayed together with the preview image.

Figure 5B:
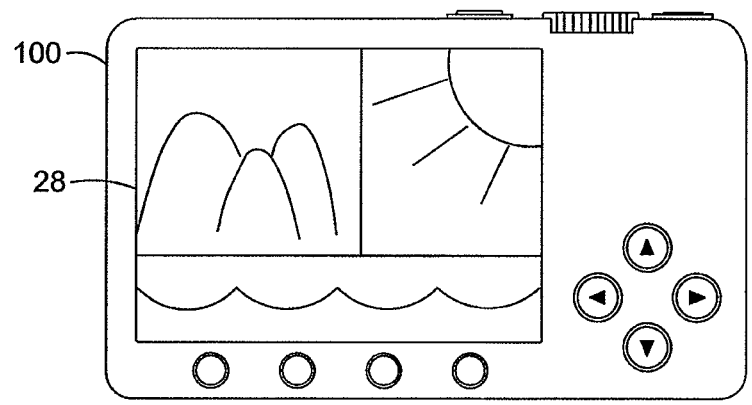

FIG. 5B is a view for explaining acceptance of a designation of a region of interest according to one example embodiment. As shown in FIG. 5B, the preview image displayed on the image display unit 28 depicts an image divided into a plurality of regions. In particular, the preview image includes three regions. In one region of the preview image, a landscape of mountains in the background is displayed. In another region, the sun is displayed. In a third region, a body of water is displayed.

The user controlling the image capture device 100 views the image displayed on the image display unit 28 as shown in FIG. 5A, and decides whether an imaging property for at least one of the regions in the image should be adjusted. In this example embodiment, if the user decides to adjust the imaging property for a designated ROI, the image is divided for the user to select and adjust the imaging property for the designated ROI. For example, if the user decides that the brightness values for the three different areas of the image should be adjusted, the image is divided into three regions of interest for the user to select and adjust the exposure values. If the user decides that the color balance values for the three different areas of the image should be adjusted, the image is divided into three regions of interest for the user to select and adjust the color balance values. If the user decides that the focal lengths for the three different areas of the image should be adjusted, the image is divided into three regions of interest for the user to select and adjust the focal lengths. Division of the image is described in more detail below, with respect to FIG. 6.

Figure 5C:
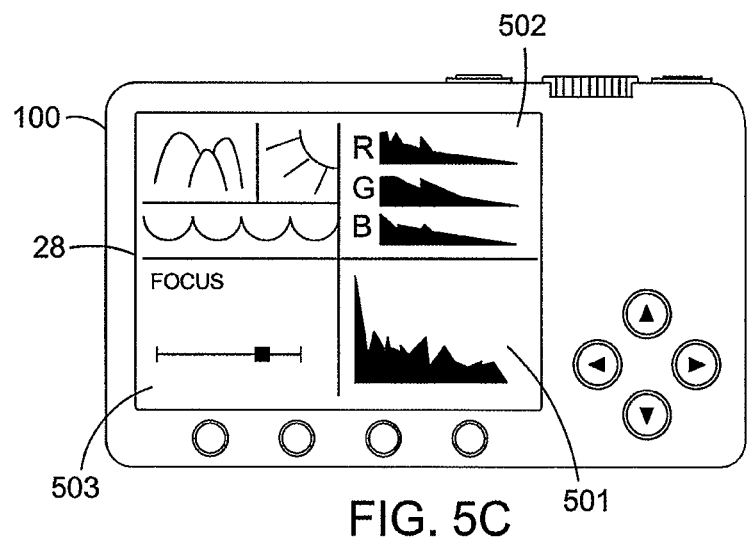
Figure 5D:
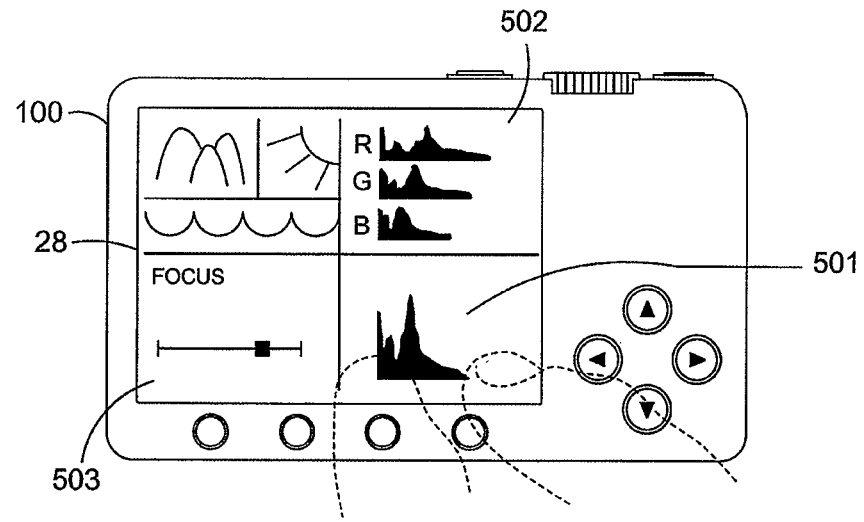
Figure 5E:
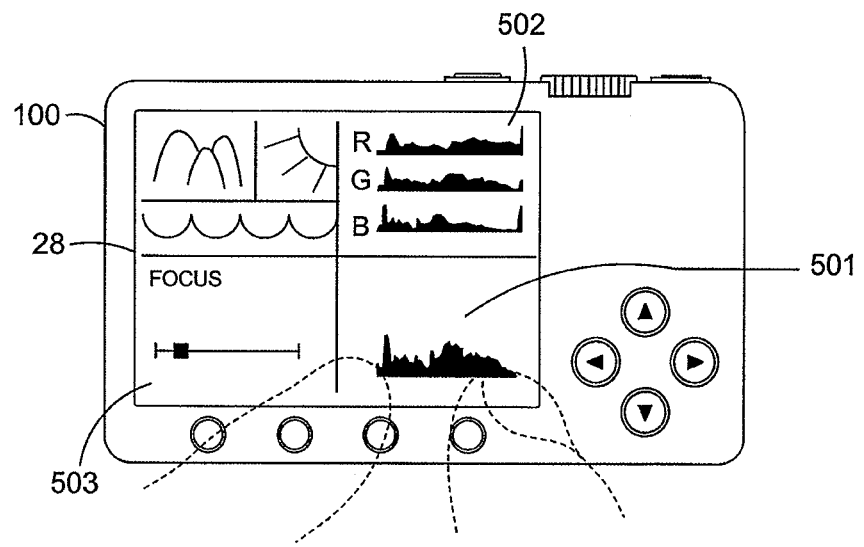

FIGS. 5C to 5E are views for explaining acceptance of a selection of targeted imaging properties according to one example embodiment. In particular, FIGS. 5C to 5E are examples of user interfaces including imaging property ranges, which effect the selection of target ranges for such imaging properties.

As shown in FIG. 5C, image display unit 28 displays on the user interface imaging property ranges of the image data previewed on image display unit 28. By manipulating the imaging property ranges as shown in FIGS. 5D and 5E, the user effects the selection of targeted imaging properties for the designated region of interest. In some example embodiments, the user interface displays imaging property ranges including values of the imaging properties which fall within tunable ranges of the imaging assembly. As discussed below in more detail with respect to FIG. 6, after the user designates one region of interest and selects a target range for an imaging property for the designated region, the user may then designate a different region on the image display unit 28.

For example, in the case that the targeted imaging property is a target range for brightness, the image display unit 28 displays on the user interface a brightness range of the image data previewed on image display unit 28. In some example embodiments, the brightness range is displayed as a brightness histogram 501. In other example embodiments, the brightness range is displayed as a slide bar, a dial, a button, or any other type of suitable representation. By manipulating the brightness range, the user effects the selection of the target range for brightness for the region of interest. With this arrangement, the user selects the target range for brightness for the designated region of interest, typically with ease and simplicity.

In the case that the targeted imaging property is a target range for color balance, the image display unit 28 displays on the user interface color channel ranges of the image data previewed on image display unit 28. In some example embodiments, the color channel ranges are displayed as color channel histograms 502. In other example embodiments, the color channel ranges are displayed as slide bars, dials, buttons, or any other type of suitable representation. By manipulating the color channel ranges, the user effects the selection of the target range for color balance for the region of interest. With this arrangement, the user selects the target range for color balance for the designated ROI, typically with ease and simplicity.

In the case that the targeted imaging property is a target range for focus, the image display unit 28 displays on the user interface focal lengths of the image data previewed on image display unit 28. In some example embodiments, the focal lengths are indicated by a slide bar 503 that is displayed on the user interface. In other example embodiments, the focal lengths are displayed by using dials, buttons, or any other type of suitable representation. By manipulating the focal lengths, the user effects the selection of the target focal length for the region of interest. With this arrangement, the user selects the target focal length for the designated ROI, typically with ease and simplicity.

In this example embodiment, for a designated ROI, the user selects at least one targeted imaging property for adjustment. For example, the user can select one of the target range for brightness, the target range for color balance, or the target range for focus. In addition, the user can select each of the target range for brightness, the target range for color balance and the target range for focus. Thus, the user can select any combination of imaging properties for adjustment.

Moreover, in this embodiment, ranges for all of the targeted imaging properties to be adjusted are displayed on a single user interface. For example, the user interface displays histograms representing color channel ranges together with a histogram representing a brightness range and a slide bar representing a focal length. Alternatively, selection of targeted imaging properties can be performed in a multi-step process, in which the user interface displays one or any combination of targeted imaging properties to be adjusted.

In some example embodiments, after the user selects a region of interest and selects a target range for the imaging property for the designated region, the image capture device automatically determines an appropriate transition of the imaging property at a boundary between the selected region of interest and other regions in the preview image. For example, the image capture device may interpolate the values of the imaging property at the boundary between the designated region of interest and another region in the preview image, such that the transition between the regions is smooth.

The user interfaces depicted in FIGS. 5A to 5E are merely examples of user interfaces which can be displayed by user interface module 254 according to this example embodiment. It should be understood that other types of suitable interfaces can also be displayed.

Figures 6, 6A:
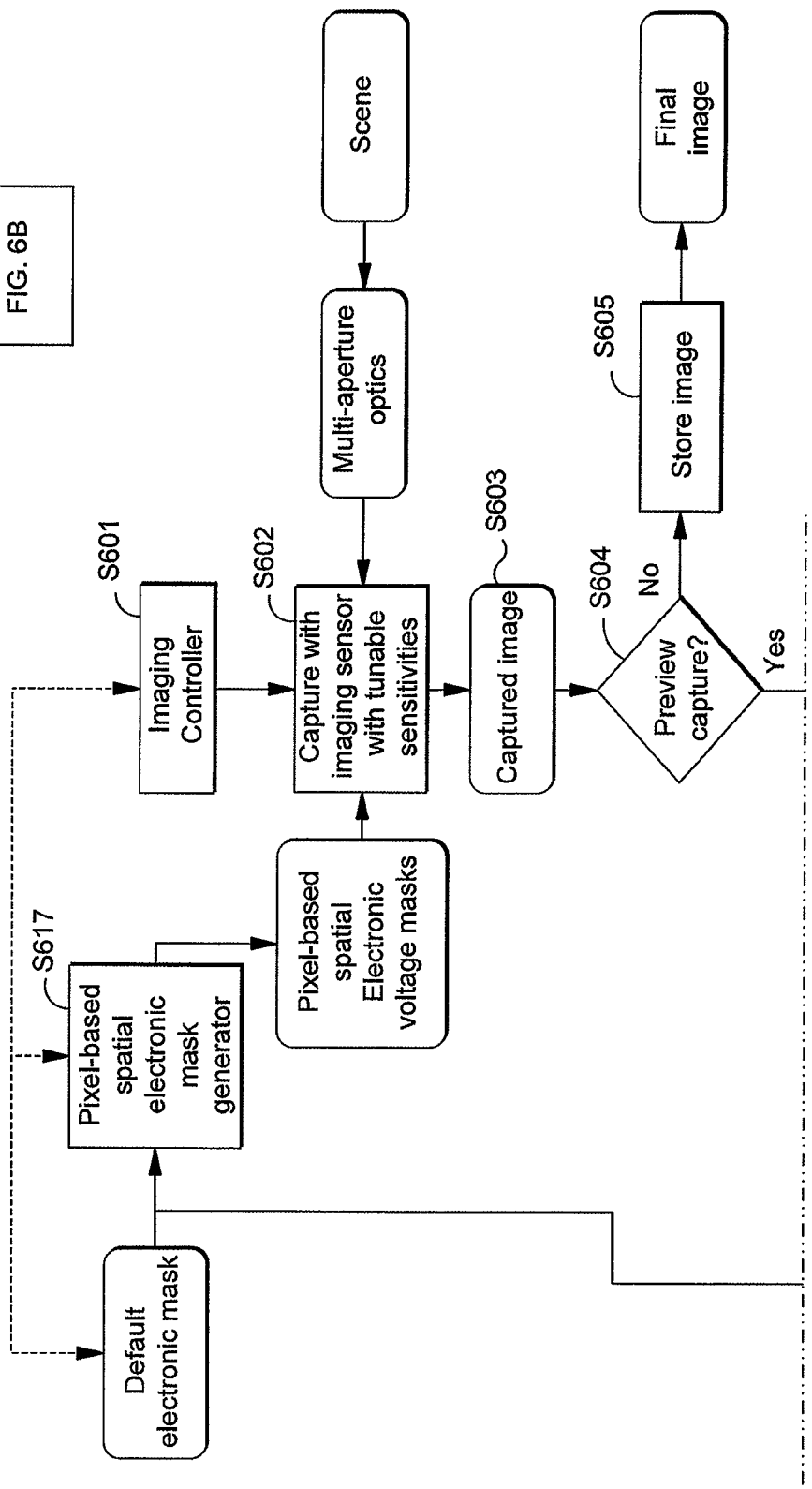
FIG. 6 is a flow diagram for explaining processing in the image capture device shown in FIG. 1 according to an example embodiment.
Figure 6B:
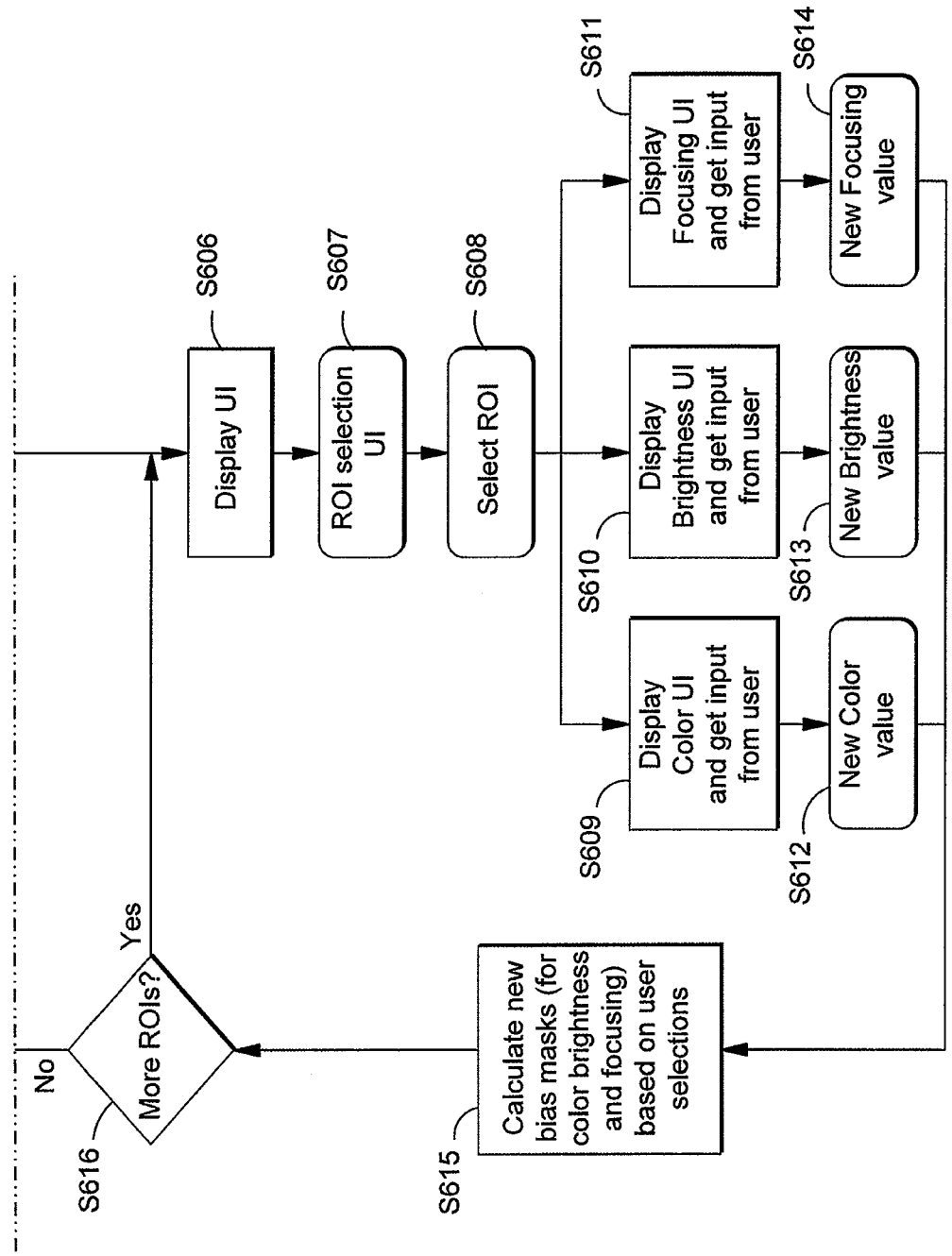

FIG. 6 is a flow diagram for explaining processing in the image capture device shown in FIG. 1 according to an example embodiment. In that regard, it should be understood that FIG. 6 is intended to provide a conceptual view of the nature of the processes performed. Thus, some steps in FIG. 6 are performed continuously, or the particular order and sequence of steps might change. For example, selection of targeted imaging properties could occur before selection of a number of spectral channels and generation of a capture mask.

Briefly, in FIG. 6, an image is captured by using an image capture device that includes an imaging assembly having a spectral sensitivity that is tunable in accordance with a spectral capture mask, together with light-field optics for projecting a light-field of a scene onto the imaging assembly. A first spectral capture mask is applied to the imaging assembly and preview image data of a scene is captured under the first capture mask. A designation of a region of interest, and a designation of a capture preference in the region of interest are received. A second spectral capture mask is calculated by calculations which use the preview image data and the capture preference for the region of interest. The second spectral capture mask is applied to the imaging assembly, and light-field image data of the scene is captured under the second spectral capture mask.

In more detail, in step S601, a number of spectral channels is selected. In the example embodiment, the number of spectral channels is selected in accordance with a user-selection received by user interface module 254. The selected number of spectral channels are used in generation of an initial (default) capture mask. Thus, if a user selects three spectral channels, then the initial capture mask will tune three channels for each pixel. For example, a user could select 3 (e.g., basic RGB), 5, 7, or another number of channels. The number of channels could be limited based on the hardware (i.e., the number of contacts). The selection also allows the user to configure the camera in accordance with picture quality. In particular, the quality of the captured image can decrease as the number of channels increases, as less energy is available for each channel. In the example embodiment, the initial capture mask is generated for tuning the image sensor 14 to a uniform spectral sensitivity.

The selection of a number of spectral channels could also be accomplished automatically, for example by the image capture apparatus itself; or by instructions from an external apparatus.

In steps S602 and S603, control module 250 applies the initial capture mask to the image sensor 14, control module 250 captures a preview image by using the image processing module 256, and the preview image is displayed by the image display unit 28, in response to a half stroke of shutter switch (SW1) 62 by a user of the image capture device 100.

In step S604, control module 250 determines whether the captured image is the preview image. In the example embodiment, the captured image is determined to be the preview image if the image was captured in response to a half stroke of shutter switch (SW1) 62 by a user of the image capture device 100.

If it is determined that the captured image is not the preview image ("NO" in step S604), then the captured image is stored (step S605). If it is determined that the captured image is the preview image ("YES" in step S604), then processing proceeds to step S606.

In step S606, control module 250 controls user interface module 254 to display a user interface which includes a preview image based on the captured preview image data of the scene, for example, as shown in FIG. 5A. In some embodiments, the user interface also includes ranges for imaging properties of the preview image, in addition to the preview image. The preview image may reflect default focal lengths, or it may reflect updated focal lengths for one or more regions previously selected and adjusted by the user.

In step S607, the preview image is divided into a plurality of regions of interest (ROI) so that the user can select and adjust the imaging properties for a designated ROI, as shown in FIG. 5B.

In step S608, control module 250 receives a user designation of an ROI of the displayed preview image. In this example embodiment, the ROI is designated by the user through an input via a button associated with the operation unit 70 which is then relayed to the system controller 50. In other embodiments, the user designates the ROI by contacting the region of the image displayed on the image display unit 28 where the image display unit 28 is a touch screen, or by voice command.

Multiple different methods of dividing the image into regions are possible. In one example, RGB (or other color scheme) values are determined for each pixel in the preview image, and pixels having substantially the same RGB values (or within a certain range or tolerance) are determined to be included in the same ROI. Alternatively, the ROI can be actively determined. For example, when the user designates the ROI in the preview image, the image capture device can determine which pixels of the image are included in the ROI. For example, a spatial filtering algorithm is executed to determine the edges of the ROI. In this example embodiment, if the user decides to adjust the imaging property for a designated ROI, the image is divided for the user to select and adjust the brightness, color and/or focus for the designated ROI. For example, if the user decides that the brightness, color and/or focus for the three different areas of the image should be adjusted, the image is divided into three regions of interest for the user to select and adjust the imaging properties. Of course, any other suitable processes for dividing the image into regions can also be used. Additionally, the user may adjust the size of the regions relative to the image displayed.

In steps S609, S610 and S611, user interfaces for selection of the target range for color balance, the target range for brightness, and the target range for focus (respectively) are displayed. In the example embodiment, the user interfaces for selection of the target range for color balance, the target range for brightness, and the target range for focus are displayed simultaneously on the image display unit 28. For example, as shown in FIG. 5C, image display unit 28 displays a user-adjustable histogram 502 representing color channel ranges together with a user-adjustable histogram 501 representing a brightness range and a slide bar 503 representing a focal length. Alternatively, selection of targeted imaging properties can be performed in a multi-step process, in which the user interface displays one or any combination of user interfaces for targeted imaging properties to be adjusted.

In steps S612, S613 and S614, user interface module 254 accepts a user selection of the target range for color balance, the target range for brightness, and the target range for focus (respectively) for the ROI, for example, as shown in FIGS. 5C to 5E. In the case that the targeted imaging property is a target range for brightness, the user interface module 254 displays a brightness range 501 of the preview image data and accepts a user manipulation of the brightness range so as to effect the selection of the target range for brightness for the ROI. In the case that the targeted imaging property is a target range for color balance, the user interface module 254 displays color channel ranges 502 of the preview image data and accepts a user manipulation of the color channel ranges so as to effect the selection of the target range for color balance for the ROI. In the case that the targeted imaging property is a target range for focus, the user interface module 254 displays focal lengths 503 of the preview image data and accepts a user manipulation of the focal lengths so as to effect the selection of the target focal length for the ROI. With this arrangement, the user advantageously specifies the imaging property associated with a specific region of interest in the image displayed on the image display unit 28, rather than making a global adjustment to the entire image displayed on the image display unit 28. Furthermore, the user advantageously specifies the imaging property based on any suitable criteria, including, for example, a lookup table and/or aesthetic concerns.

In step S615, control module 250 receives the user selection of the targeted imaging properties from user interface module 254, and controls calculation module 255 to determine the modified values of the targeted imaging properties for the ROI, based on the user selection of the targeted imaging properties in steps S609, S610 and S611.

The calculation module 255 computes a revised capture setting for the spectral responsivity of the tunable image sensor 14, by revising the initial capture setting based on the targeted imaging properties for the ROI as selected by the user. In this embodiment, the revised capture setting comprises an electronic spatial mask. Generally, the calculation module 255 computes the revised capture setting based on the modified values of the targeted imaging properties for the ROI which are calculated from the user selection of the targeted imaging properties for color and brightness in steps S609 and S610. In the example embodiment, the revised capture setting has the same number of spectral components as the initial capture mask.

More specifically, in the case that the targeted imaging property is a target range for brightness, computing the revised capture setting for the spectral responsivity of the tunable image sensor 14 comprises revising the initial capture setting based on the target range for brightness for the ROI as selected by the user. In this case, the initial capture setting is revised by computing a brightness change parameter based on a comparison of original brightness values in the preview image data with the target range of brightness for the ROI as selected by the user, and combining the brightness change parameter with the initial capture setting so as to compute the revised capture setting. In particular, computing the brightness change parameter comprises calculating a difference between the original brightness values in the preview image data and the target range of brightness for the ROI as selected by the user. In this case, the revised capture setting comprising the electronic spatial mask is generated by associating the brightness change parameters with bias voltages for the electronic spatial mask.

In the case that the targeted imaging property is a target range for color balance, computing the revised capture setting for the spectral responsivity of the tunable image sensor 14 comprises revising the initial capture setting based on the target range for color balance for the ROI as selected by the user. In this case, the default capture setting is revised by computing color change parameters based on a comparison of original color channel values in the preview image data with the target color balance for the ROI as selected by the user, and combining the color change parameters with the initial capture setting so as to compute the revised capture setting. In particular, computing the color change parameters comprises calculating a difference between the original color channel values in the preview image data and the target color balance for the ROI as selected by the user. In this case, the revised capture setting comprising the electronic spatial mask is generated by associating the color change parameters with bias voltages for the electronic spatial mask.

Additionally, the calculation module 255 computes a revised light-field spatial selection mask based on the targeted focal length for the ROI as selected by the user in step S611.

Figure 7:
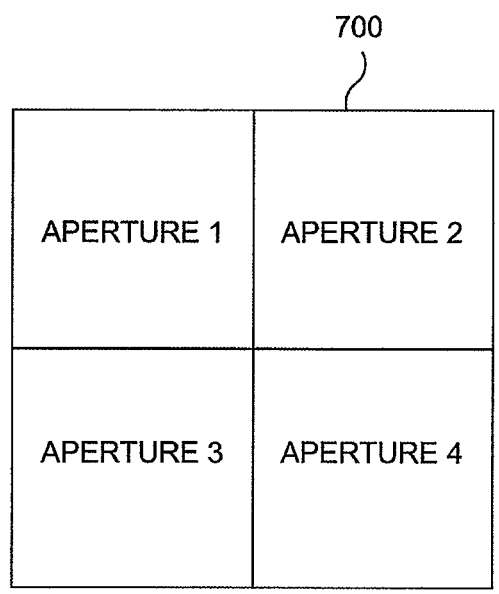
FIG. 7 is a view for explaining a super-pixel according to an example embodiment.

In this regard, control of focal length for an ROI may be managed in terms of super-pixels. Each super-pixel is comprised of a group of pixels, each pixel having a different aperture, as shown in FIG. 7 (which depicts a 4-pixel super-pixel). There is an initial aperture selection for each super-pixel of the image, based on imaging auto-exposure.

The super-pixel could be of various sizes, e.g., 4 pixels, 9 pixels, 16 pixels or larger, but as the super-pixel becomes larger, resolution may decrease. Thus, ordinarily a 4-pixel super-pixel will be appropriate. Other geometries could be used for the super-pixel, such as triangular, hexagonal, and other polygonal pixel shapes. In the example embodiment, the super-pixels are managed by the light-field spatial selection mask, which is separate from the electronic spatial masks used to tune image sensor 14 for capture of spectral data. The super-pixel may be constructed by rearranging captured data. For example, due to the nature of some light-field gathering units, the pixels of the super-pixel may not actually be physically adjacent when captured, and are instead rearranged after capture.

The super-pixel reduces the overall amount of processing required, and thus conserves time and processing power. In particular, data for pixels in the super-pixel that are associated with a selected (or default) aperture is processed, and data for pixels in the super-pixel that are not associated with a selected (or default) aperture is not processed, as discussed more fully below. In contrast, processing data for each pixel of an entire image could lead to significant decrease in processing speed.

As mentioned above, a single super-pixel includes four pixels, with each pixel having a different aperture. The apertures for each pixel of the super-pixel may be predefined in the hardware, defined by a manufacturer or user, or otherwise set at default values.

In step S615, there is a determination as to which aperture in each super-pixel of the selected ROI should be selected in order to produce or approach a focus selected by the user in step S614.

In the example embodiment, using the target focal length selected by the user in step S614, calculation module 255 interpolates to select the aperture of the super-pixel which corresponds most closely to the necessary aperture for the selected focal length. Calculation module 255 computes the revised light-field spatial selection mask to include information identifying the apertures selected by the calculation module 255.

In the example embodiment, control module 250 applies the revised light-field spatial selection mask to light-field gathering assembly 99 to effect selection of apertures of the light-field gathering assembly 99 that are selected by calculation module 255.

Thus, for the example super-pixel shown in FIG. 7, the image capture device may determine that "Aperture 4" provides the focus closest to the focus selected by the user (or the focus otherwise determined). Accordingly, Aperture 4 would be selected for the super-pixel.

In the example embodiment, information identifying the selected apertures are stored in the light-field spatial selection mask which is independent from the capture mask used for the tunable spectral sensitivities. The light-field spatial selection mask reflects the updated focus selected by the user for one or more regions, and is updated and/or regenerated based on the user selections of foci. In addition, the light-field spatial selection mask is stored in non-volatile memory 56, for example as part of spatial masks 252.

Further details of aperture selection can be found in U.S. patent application Ser. No. 12/886,337, filed Sep. 20, 2010, titled "Image Capture With Focus Adjustment", by Francisco Imai, the contents of which are incorporated by reference herein.

In step S616 user interface module 254 determines whether the user intends to select addition ROIs in the preview image. If the user interface module 254 determines that additional ROIs are to be selected ("YES" in step S616), then processing returns to step S606, in which the preview image is displayed for user selection of additional ROIs. In the case where additional ROIs are selected, the revised capture setting is computed such that it tunes the image sensor 14 to a non-uniform spectral sensitivity in the case where different spectral sensitivities are selected by the user for different ROIs. In such a case, the revised capture setting tunes the image sensor 14 to a non-uniform spectral sensitivity, as compared to the initial capture mask that tunes the image sensor to a uniform spectral sensitivity. If the user interface module 254 determines that no additional ROIs are to be selected ("NO" in step S616), then processing proceeds to step S617.

In step S617, the control module 250 applies the revised capture setting for spectral responsivity to the tunable image sensor 14 for setting the spectral response of the tunable image sensor 14 to the revised setting. In the example embodiment, control module 250 also applies the light-field spatial selection mask to the light-field optics to select the selected apertures of the light-field optics in accordance with the selected focal lengths for each ROI. In particular, the light-field optics are refocused to the apertures selected in step S615, in order to generate a focus closest to a desired focus. Thus, the light-field optics (or sections thereof, e.g., by adjusting the focusing distances of the mini-lenses) can be selectively focused and defocused for different regions to the selected apertures, to achieve or at least approximate the desired ranges of focus or degrees of sharpness.

As described above, in other embodiments, rather than using the light-field spatial selection mask to change light-field gathering assembly 99 to select apertures of the light-field gathering assembly 99, the light-field spatial selection mask is used to change the spectral capture mask to either decrease sensitivity values or disable image capture for pixels that are associated with apertures that do not correspond to focal lengths selected by the user.

In response to a full stroke of shutter switch (SW2) 64 by a user of the image capture device 100, control module 250 controls image processing module 256 to capture image data from the imaging assembly using the revised capture setting (steps S602 and S603), and stores the image data ("No" in step S604, and step S605).

In more detail, in the example embodiment, all pixels of the image sensor 14 are used for image capture. A determination is made as to which pixels are associated with an aperture selected in step S615 by using a lookup table (LUT), a mapping function, or the like. System controller 50 performs processing to read image signals from pixels of the image sensor 14 that are determined to be associated with selected apertures. The image signals are converted into image data by the A/D converter 16. The image data is processed by the image processor 20, and the memory controller 22 writes the data in the memory 30. The image data is read from the memory 30, the compression/decompression circuit 32 compresses the image data, and the compressed image data is written in the recording medium 200 or 210.

In other embodiments, in which the light-field spatial selection mask is used to change the spectral capture mask to decrease sensitivity values of pixels that are associated with apertures that do not correspond to focal lengths selected by the user, all pixels of the image sensor 14 are used for image capture. A determination is made as to which pixels have low image signals that are below a threshold value. For each pixel that has an image signal that is above the threshold value, system controller 50 performs processing to read image signals from the pixels. Image signals that are below the threshold value are not read. The read image signals that are above the threshold value are converted into image data by the A/D converter 16. The image data is processed by the image processor 20, and the memory controller 22 writes the data in the memory 30. The image data is read from the memory 30, the compression/decompression circuit 32 compresses the image data, and the compressed image data is written in the recording medium 200 or 210.

According to other embodiments contemplated by the present disclosure, example embodiments may include a computer processor such as a single core or multi-core central processing unit (CPU) or micro-processing unit (MPU), which is constructed to realize the functionality described above. The computer processor might be incorporated in a stand-alone apparatus or in a multi-component apparatus, or might comprise multiple computer processors which are constructed to work together to realize such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. For these purposes, access to the non-transitory computer-readable storage medium may be a local access such as by access via a local memory bus structure, or may be a remote access such as by access via a wired or wireless network or Internet. The computer processor(s) may thereafter be operated to execute the computer-executable program or program steps to perform functions of the above-described embodiments.

According to still further embodiments contemplated by the present disclosure, example embodiments may include methods in which the functionality described above is performed by a computer processor such as a single core or multi-core central processing unit (CPU) or micro-processing unit (MPU). As explained above, the computer processor might be incorporated in a stand-alone apparatus or in a multi-component apparatus, or might comprise multiple computer processors which work together to perform such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. Access to the non-transitory computer-readable storage medium may form part of the method of the embodiment. For these purposes, access to the non-transitory computer-readable storage medium may be a local access such as by access via a local memory bus structure, or may be a remote access such as by access via a wired or wireless network or Internet. The computer processor(s) is/are thereafter operated to execute the computer-executable program or program steps to perform functions of the above-described embodiments.

The non-transitory computer-readable storage medium on which a computer-executable program or program steps are stored may be any of a wide variety of tangible storage devices which are constructed to retrievably store data, including, for example, any of a flexible disk (floppy disk), a hard disk, an optical disk, a magneto-optical disk, a compact disc (CD), a digital versatile disc (DVD), micro-drive, a read only memory (ROM), random access memory (RAM), erasable programmable read only memory (EPROM), electrically erasable programmable read only memory (EEPROM), dynamic random access memory (DRAM), video RAM (VRAM), a magnetic tape or card, optical card, nanosystem, molecular memory integrated circuit, redundant array of independent disks (RAID), a nonvolatile memory card, a flash memory device, a storage of distributed computing systems and the like. The storage medium may be a function expansion unit removably inserted in and/or remotely accessed by the apparatus or system for use with the computer processor(s).

This disclosure has provided a detailed description with respect to particular representative embodiments. It is understood that the scope of the appended claims is not limited to the above-described embodiments and that various changes and modifications may be made without departing from the scope of the claims.

What is claimed is:

1. An image capture apparatus comprising:
an imaging assembly having a spectral sensitivity tunable in accordance with a spectral capture mask and light-field optics for projecting a light-field of a scene onto the imaging assembly, wherein the light-field optics comprise multi-aperture light-field optics, wherein different apertures of the multi-aperture light-field optics are managed in units of super-pixels, and wherein each super-pixel is comprised of a group of pixels, each pixel having a different aperture; and
a controller constructed to control the image capture apparatus to:
apply a first spectral capture mask to the imaging assembly;
capture preview image data of a scene under the first capture mask;
receive a designation of a region of interest;
receive a designation of a capture preference in the region of interest;
calculate a second spectral capture mask by calculations which use the preview image data and the capture preference for the region of interest;
apply the second spectral capture mask to the imaging assembly; and
capture light-field image data of the scene under the second spectral capture mask;
wherein a user-selection of a focus is determined from the received capture preference, and
wherein for each super-pixel, an aperture of the super-pixel is selected in accordance with the user-selection of the focus, and image capture is performed in accordance with the selected aperture.

2. The image capture apparatus according to claim 1, wherein the capture preference includes at least one selected from the group which includes color, brightness, focus and sharpness.

3. The image capture apparatus according to claim 2, wherein the preview image data is displayed, the region of interest is a region of the displayed preview image data, the region of interest is user-designated, and the capture preference is user-designated.

4. The image capture apparatus according to claim 2,
wherein the imaging assembly has an image sensor which has a tunable spectral sensitivity that is tunable in accordance with the spectral capture mask,
wherein a light-field spatial selection mask is calculated by calculations which use the capture preference for the region of interest, and
wherein the light-field spatial selection mask is applied to the light-field optics of the imaging assembly, the second spectral capture mask is applied to the image sensor of the imaging assembly, and light-field image data of the scene is captured under the light-field spatial selection mask and the second spectral capture mask.

5. The image capture apparatus according to claim 1, wherein the first spectral capture mask tunes the imaging assembly to a uniform spectral sensitivity.

6. The image capture apparatus according to claim 1, wherein the first and second spectral capture masks each tune the imaging assembly to a spectral sensitivity having three spectral components.

7. The image capture apparatus according to claim 1, wherein the first and second spectral capture masks each tune the imaging assembly to a spectral sensitivity having more than three spectral components.

8. The image capture apparatus according to claim 1, wherein the second spectral capture mask tunes the imaging assembly to a non-uniform spectral sensitivity.

9. An image capture method for use in an image capture device which includes an imaging assembly having a spectral sensitivity tunable in accordance with a spectral capture mask and light-field optics for projecting a light-field of a scene onto the imaging assembly, wherein the light-field optics comprise multi-aperture light-field optics, wherein different apertures of the multi-aperture light-field optics are managed in units of super-pixels, and wherein each super-pixel is comprised of a group of pixels, each pixel having a different aperture, the method comprising:
applying a first spectral capture mask to the imaging assembly;
capturing preview image data of a scene under the first capture mask;
receiving a designation of a region of interest;
receiving a designation of a capture preference in the region of interest; calculating a second spectral capture mask by calculations which use the preview image data and the capture preference for the region of interest;
applying the second spectral capture mask to the imaging assembly; and
capturing light-field image data of the scene under the second spectral capture mask;
wherein a user-selection of a focus is determined from the received capture preference, and
wherein for each super-pixel, an aperture of the super-pixel is selected in accordance with the user-selection of the focus, and image capture is performed in accordance with the selected aperture.

10. The method according to claim 9, wherein the capture preference includes at least one selected from the group which includes color, brightness, focus and sharpness.

11. The method according to claim 10, wherein the preview image data is displayed, the region of interest is a region of the displayed preview image data, the region of interest is user-designated, and the capture preference is user-designated.

12. The method according to claim 10,
wherein the imaging assembly has an image sensor which has a tunable spectral sensitivity that is tunable in accordance with the spectral capture mask,
wherein a light-field spatial selection mask is calculated by calculations which use the capture preference for the region of interest, and
wherein the light-field spatial selection mask is applied to the light-field optics of the imaging assembly, the second spectral capture mask is applied to the image sensor of the imaging assembly, and light-field image data of the scene is captured under the light-field spatial selection mask and the second spectral capture mask.

13. The method according to claim 9, wherein the first spectral capture mask tunes the imaging assembly to a uniform spectral sensitivity.

14. The method according to claim 9, wherein the first and second spectral capture masks each tune the imaging assembly to a spectral sensitivity having three spectral components.

15. The method according to claim 9, wherein the first and second spectral capture masks each tune the imaging assembly to a spectral sensitivity having more than three spectral components.

16. The method according to claim 9, wherein the second spectral capture mask tunes the imaging assembly to a non-uniform spectral sensitivity.

17. A non-transitory computer-readable storage medium having stored thereon a processing module for an image capture apparatus, comprising:

an image processing module for capturing image data with an imaging assembly of the image capture apparatus, wherein the imaging assembly has a spectral sensitivity that is tunable in accordance with a spectral capture mask and light field optics for projecting a light-field of a scene onto the imaging assembly, wherein the light-field optics comprise multi-aperture light-field optics, wherein different apertures of the multi-aperture light-field optics are managed in units of super-pixels, and wherein each super-pixel is comprised of a group of pixels, each pixel having a different aperture; and a control module for controlling the image capture apparatus to:

apply a first spectral capture mask to the imaging assembly;

capture preview image data of a scene under the first capture mask;

receive a designation of a region of interest;

receive a designation of a capture preference in the region of interest;

calculate a second spectral capture mask by calculations which use the preview image data and the capture preference for the region of interest;

apply the second spectral capture mask to the imaging assembly; and capture light-field image data of the scene under the second spectral capture mask;

wherein a user-selection of a focus is determined from the received capture preference, and wherein for each super-pixel, an aperture of the super-pixel is selected in accordance with the user-selection of the focus, and image capture is performed in accordance with the selected aperture.

18. The computer-readable storage medium according to claim 17, wherein the capture preference includes at least one selected from the group which includes color, brightness, focus and sharpness.

19. The computer-readable storage medium according to claim 18, wherein the preview image data is displayed, the region of interest is a region of the displayed preview image data, the region of interest is user-designated, and the capture preference is user-designated.

20. The computer-readable storage medium according to claim 18, wherein the imaging assembly has an image sensor which has a tunable spectral sensitivity that is tunable in accordance with the spectral capture mask, wherein a light-field spatial selection mask is calculated by calculations which use the capture preference for the region of interest, and wherein the light-field spatial selection mask is applied to the light-field optics of the imaging assembly, the second spectral capture mask is applied to the image sensor of the imaging assembly, and light-field image data of the scene is captured under the light-field spatial selection mask and the second spectral capture mask.

21. The computer-readable storage medium according to claim 17, wherein the first spectral capture mask tunes the imaging assembly to a uniform spectral sensitivity.

22. The computer-readable storage medium according to claim 17, wherein the first and second spectral capture masks each tune the imaging assembly to a spectral sensitivity having three spectral components.

23. The computer-readable storage medium according to claim 17, wherein the first and second spectral capture masks each tune the imaging assembly to a spectral sensitivity having more than three spectral components.

24. The computer-readable storage medium according to claim 17, wherein the second spectral capture mask tunes the imaging assembly to a non-uniform spectral sensitivity.

25. The computer-readable storage medium according to claim 17, wherein the processing module further comprises a user interface module and a calculation module, wherein the control module controls the image capture apparatus to capture the preview image data by using the image processing module, wherein the control module controls the image capture apparatus to receive the designation of the region of interest and the designation of the capture preference from the user interface module, wherein the control module controls the image capture apparatus to calculate the second spectral capture mask by using the calculation module, and wherein the control module controls the image capture apparatus to capture the light-field image data of the scene under the second spectral capture mask by using the image processing module.

26. A non-transitory computer-readable storage medium retrievably storing computer-executable process steps for performing an image capture method for use in an image capture device which includes an imaging assembly having a spectral sensitivity tunable in accordance with a spectral capture mask and light-field optics for projecting a light-field of a scene onto the imaging assembly, wherein the light-field optics comprise multi-aperture light-field optics, wherein different apertures of the multi-aperture light-field optics are managed in units of super-pixels, and wherein each super-pixel is comprised of a group of pixels, each pixel having a different aperture, the method comprising:

applying a first spectral capture mask to the imaging assembly;

capturing preview image data of a scene under the first capture mask;

receiving a designation of a region of interest;

receiving a designation of a capture preference in the region of interest;

calculating a second spectral capture mask by calculations which use the preview image data and the capture preference for the region of interest;

applying the second spectral capture mask to the imaging assembly; and capturing light-field image data of the scene under the second spectral capture mask;

wherein a user-selection of a focus is determined from the received capture preference, and wherein for each super-pixel, an aperture of the super-pixel is selected in accordance with the user-selection of the focus, and image capture is performed in accordance with the selected aperture.

27. The computer-readable storage medium according to claim 26, wherein the capture preference includes at least one selected from the group which includes color, brightness, focus and sharpness.

28. The computer-readable storage medium according to claim 27, wherein the preview image data is displayed, the region of interest is a region of the displayed preview image data, the region of interest is user-designated, and the capture preference is user-designated.

29. The computer-readable storage medium according to claim 27,
wherein the imaging assembly has an image sensor which has a tunable spectral sensitivity that is tunable in accordance with the spectral capture mask,
wherein a light-field spatial selection mask is calculated by calculations which use the capture preference for the region of interest, and
wherein the light-field spatial selection mask is applied to the light-field optics of the imaging assembly, the second spectral capture mask is applied to the image sensor of the imaging assembly, and light-field image data of the scene is captured under the light-field spatial selection mask and the second spectral capture mask.

30. The computer-readable storage medium according to claim 26, wherein the first spectral capture mask tunes the imaging assembly to a uniform spectral sensitivity.

31. The computer-readable storage medium according to claim 26, wherein the first and second spectral capture masks each tune the imaging assembly to a spectral sensitivity having three spectral components.

32. The computer-readable storage medium according to claim 26, wherein the first and second spectral capture masks each tune the imaging assembly to a spectral sensitivity having more than three spectral components.

33. The computer-readable storage medium according to claim 26, wherein the second spectral capture mask tunes the imaging assembly to a non-uniform spectral sensitivity.

* * * * *